US010620794B2

(12) United States Patent
Cotterill et al.

(10) Patent No.: US 10,620,794 B2
(45) Date of Patent: Apr. 14, 2020

(54) DEVICE, METHOD, AND GRAPHICAL USER INTERFACE FOR SWITCHING BETWEEN TWO USER INTERFACES

(75) Inventors: Stephen Hayden Cotterill, San Jose, CA (US); Jake M. Logan, Palo Alto, CA (US); Oleksandr Kuvshynov, San Jose, CA (US); Erik M. Cressall, San Jose, CA (US); Brandon J. Casey, San Jose, CA (US); Jeffrey Paul McCurdy Hultquist, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1404 days.

(21) Appl. No.: 13/077,614

(22) Filed: Mar. 31, 2011

(65) Prior Publication Data
US 2012/0166998 A1 Jun. 28, 2012

Related U.S. Application Data

(60) Provisional application No. 61/427,035, filed on Dec. 23, 2010.

(51) Int. Cl.
*G06F 3/0483* (2013.01)

(52) U.S. Cl.
CPC .. *G06F 3/0483* (2013.01); *G06F 2203/04803* (2013.01)

(58) Field of Classification Search
CPC ....... G06F 17/243; G06F 3/017; G06F 3/0483
(Continued)

(56) References Cited

U.S. PATENT DOCUMENTS

| 7,593,000 | B1 | 9/2009 | Chin |
| 8,464,083 | B1* | 6/2013 | Nanda et al. ................. 713/320 |
| 8,539,550 | B1* | 9/2013 | Terres ..................... G06F 21/31 726/16 |
| 8,638,939 | B1 | 1/2014 | Casey et al. |
| 2002/0015064 | A1 | 2/2002 | Robotham et al. |

(Continued)

FOREIGN PATENT DOCUMENTS

| EP | 1 580 652 A2 | 9/2005 |
| EP | 2 075 680 A2 | 7/2009 |
| EP | 2 128 750 A2 | 12/2009 |

OTHER PUBLICATIONS

Invitation to Pay Addition Fees dated Mar. 27, 2012, received in International Application No. PCT/US2011/066997, which corresponds to U.S. Appl. No. 13/077,614, 7 pages (Cotterill).

(Continued)

*Primary Examiner* — Rashawn N Tillery
(74) *Attorney, Agent, or Firm* — Dentons US LLP

(57) ABSTRACT

An electronic device with a display and a touch-sensitive surface displays a first authentication user interface on the display, the first authentication user interface including a text entry field for entering a text-based authentication code; detects a first input by a user on the touch-sensitive surface while displaying the first authentication user interface; in response to detecting the first input, displays a second authentication user interface on the display, distinct from the first authentication user interface, the second authentication user interface configured for entering a gesture-based authentication code; while displaying the second authentication user interface, detects one or more gestures by the user at locations on the touch-sensitive surface that correspond to locations on the second authentication user interface; and authenticates the user in accordance with a determination that the detected one or more gestures correspond to a gesture-based authentication code for the user.

28 Claims, 32 Drawing Sheets

(58) Field of Classification Search
USPC ............ 715/780, 863; 340/5.51, 5.2; 713/1,
713/183; 380/277; 726/3; 705/18;
707/769
See application file for complete search history.

(56) References Cited

U.S. PATENT DOCUMENTS

| | | | |
|---|---|---|---|
| 2002/0196274 A1* | 12/2002 | Comfort et al. | ............... 345/741 |
| 2005/0251451 A1 | 11/2005 | Tan et al. | |
| 2006/0005131 A1 | 1/2006 | Tao | |
| 2006/0209040 A1 | 9/2006 | Garside et al. | |
| 2007/0222769 A1 | 9/2007 | Otsuka et al. | |
| 2007/0281666 A1* | 12/2007 | Yoshida | ........................ 455/411 |
| 2008/0001703 A1* | 1/2008 | Goto | .............................. 340/5.8 |
| 2008/0001924 A1 | 1/2008 | de los Reyes et al. | |
| 2008/0052528 A1* | 2/2008 | Poo et al. | ...................... 713/186 |
| 2008/0082934 A1 | 4/2008 | Kocienda et al. | |
| 2008/0158189 A1 | 7/2008 | Kim | |
| 2008/0168379 A1 | 7/2008 | Forstall et al. | |
| 2008/0316212 A1 | 12/2008 | Kushler | |
| 2009/0064055 A1 | 3/2009 | Chaudhri et al. | |
| 2009/0133117 A1* | 5/2009 | Bentley et al. | .................. 726/17 |
| 2009/0165121 A1 | 6/2009 | Kumar | |
| 2009/0177981 A1 | 7/2009 | Christie et al. | |
| 2009/0249235 A1 | 10/2009 | Kim et al. | |
| 2009/0271702 A1* | 10/2009 | Bamford et al. | ............. 715/702 |
| 2009/0289916 A1 | 11/2009 | Dai | |
| 2009/0303187 A1 | 12/2009 | Pallakoff | |
| 2009/0303231 A1 | 12/2009 | Robinet et al. | |
| 2009/0307768 A1 | 12/2009 | Zhang et al. | |
| 2010/0031200 A1 | 2/2010 | Chen | |
| 2010/0064261 A1 | 3/2010 | Andrews et al. | |
| 2010/0182248 A1 | 7/2010 | Chun | |
| 2010/0214237 A1 | 8/2010 | Echeverri et al. | |
| 2010/0225607 A1* | 9/2010 | Kim | .............. 345/173 |
| 2010/0235794 A1 | 9/2010 | Ording | |
| 2010/0245267 A1 | 9/2010 | Min et al. | |
| 2010/0306718 A1* | 12/2010 | Shim et al. | .................... 715/863 |
| 2011/0016417 A1 | 1/2011 | Shiplacoff et al. | |
| 2011/0035598 A1* | 2/2011 | Pizano | ........................... 713/186 |
| 2011/0076981 A1* | 3/2011 | Singh et al. | ............... 455/404.1 |
| 2011/0107416 A1* | 5/2011 | Poo et al. | ........................ 726/19 |
| 2011/0260829 A1* | 10/2011 | Lee | ............... 340/5.51 |
| 2012/0036556 A1* | 2/2012 | LeBeau et al. | .................... 726/3 |
| 2012/0075098 A1* | 3/2012 | Kuncl | ..................... 340/539.32 |
| 2012/0084734 A1* | 4/2012 | Wilairat | ........................ 715/863 |
| 2012/0166944 A1 | 6/2012 | Cotterill | |

OTHER PUBLICATIONS

International Search Report and Written Opinion dated Jun. 19, 2012, received in International Application No. PCT/US2011/066997, which corresponds to U.S. Appl. No. 13/077,614, 19 pages (Cotterill).

International Preliminary Report on Patentability dated Jul. 4, 2013, received in International Application No. PCT/US2011/066997, which corresponds to U.S. Appl. No. 13/077,614, 16 pages (Cotterill).

Final Office Action received for U.S. Appl. No. 13/077,670, dated Dec. 9, 2014, 13 pages.

Search Report and Written Opinion received for Netherlands Patent Application No. 2008029, dated Apr. 1, 2014, 13 pages.

Non-Final Office Action received for U.S. Appl. No. 13/077,670, dated Apr. 3, 2014, 10 pages.

*Apple Inc.* vs. *Samsung Electronics Co. Ltd. et al.*, Judgment in Interlocutory proceeding, Case No. 396957/KG ZA 11-730, civil law sector, Aug. 24, 2011, pp. 1-65.

*Apple Inc.* vs. *Samsung Electronics Co. Ltd., et al.*, Samsung's Motion to Supplement Invalidity Contentions, Case No. 11-cv-01846-LHK, filed Jan. 27, 2012 together with Exhibit 6, Jan. 27, 2012, 47 pages.

*Apple Inc.* vs. *Samsung Electronics Co. Ltd., et al.*, Samsung's Patent Local Rule 3-3 and 3-4 Disclosures, Case No. 11-cv-01846-LHK, dated Oct. 7, 2011, together with Exhibits G-1 through G-7 and Exhibit H, Oct. 7, 2011, 287 pages.

HTC Europe Co. Ltd and Apple Inc. Invalidity Claim dated Apr. 5, 2012, together with annexes, 12 pages.

HTC Europe Co. Ltd and Apple Inc. invalidity Claim dated Jul. 29, 2011, together with amended Particulars of Claim and amended Grounds of Invalidity, 22 pages.

Motorola Mobility Opposition Grounds to Apple Inc. European Patent EP 2126678 dated Apr. 11, 2012, together with Exhibits E3, E4, and E5 re: CHT 2005, Apr. 2-7, 2005, Portland Oregon, USA, Apr. 2012, 53 pages.

Notice of Appeal in Expedited Appeal in Summary Proceedings dated Sep. 14, 2011, pp. 1-51.

Pleading notes Mr B.J. Berghuis van Woodman, in matter of *Apple Inc.* vs *Samsung Electronics*, Case No. KG ZA 11-730 and KG ZA 11-731, Aug. 10-11, 2010, pp. 1-16.

Pleading notes Mr Kleemans, Mr Blomme and Mr Van Oorschot, in matter of *Apple Inc.* vs *Samsung Electronics*, Case No. KG ZA 11-730 and KG ZA 11-731, Aug. 10, 2011, 35 pages.

*Samsung Electronics GmbH* vs *Apple Inc.*, "List scrolling and document translation, scaling and rotation on a touch-screen display", Opposition, Jan. 30, 2012, 27 pages.

*Samsung Electronics* vs *Apple Inc.*, Statement of Defense Also Counterclaim, Case No. KG ZA 2011-730, Jul. 20, 2011, 44 pages.

*Samsung Electronics* vs *Apple Inc.*, Statement of Defense Also Counterclaim, Case No. KG ZA 2011-731, Jul. 20, 2011, 48 pages.

Final Office Action received for U.S. Appl. No. 13/077,670, dated Apr. 17, 2015, 12 pages.

Non-Final Office Action received for U.S. Appl. No. 13/077,670, dated Aug. 26, 2016, 13 pages.

Advisory Action received for U.S. Appl. No. 13/077,670, dated Aug. 25, 2015, 4 pages.

* cited by examiner

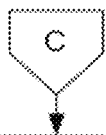

```
┌─────────────────────────────────────────────────────────────────┐
│  While displaying the second user interface, detect a second gesture by the    │──724
│  user on the touch-sensitive surface, the second gesture starting at a location │
│  on the touch-sensitive surface that corresponds to the second location of the  │
│                  graphical object on the display                                 │
│  ┌───────────────────────────────────────────────────────────┐                  │
│  │ The first gesture moves in a first direction on the touch-sensitive surface │──726
│  │   and the second gesture moves in a second direction on the touch-          │
│  │              sensitive surface, opposite the first direction                 │
│  └───────────────────────────────────────────────────────────┘                  │
│  ┌───────────────────────────────────────────────────────────┐                  │
│  │ The touch-sensitive surface is on the display; the first gesture moves in a │──728
│  │    first direction on the touch-sensitive surface away from a side of the   │
│  │   display closest to the first location of the graphical object on the display;│
│  │    and the second gesture moves in a second direction on the touch-         │
│  │   sensitive surface away from a side of the display closest to the second   │
│  │                  location of the graphical object on the display             │
│  └───────────────────────────────────────────────────────────┘                  │
│  ┌───────────────────────────────────────────────────────────┐──730             │
│  │   The first gesture is a swipe gesture and the second gesture is a swipe   │
│  │                              gesture                                         │
│  └───────────────────────────────────────────────────────────┘                  │
│  ┌───────────────────────────────────────────────────────────┐──732             │
│  │   The first gesture is a drag gesture and the second gesture is a drag     │
│  │                              gesture                                         │
│  └───────────────────────────────────────────────────────────┘                  │
│  ┌───────────────────────────────────────────────────────────┐──734             │
│  │   The first gesture is a tap gesture and the second gesture is a tap gesture│
│  └───────────────────────────────────────────────────────────┘                  │
└─────────────────────────────────────────────────────────────────┘
                                      ▼
┌─────────────────────────────────────────────────────────────────┐
│                 In response to detecting the second gesture:                    │
│                                                                 │──736
│  ┌───────────────────────────────────────────────────────────┐  │
│  │  Move the graphical object across the display to the first location on the │
│  │                              display                                         │
│  └───────────────────────────────────────────────────────────┘  │
│                                      ▼                          │──738
│  ┌───────────────────────────────────────────────────────────┐  │
│  │              Display the first user interface on the display               │──740
│  │  ┌─────────────────────────────────────────────────────┐  │  │
│  │  │ Replace display of the second user interface with display of the first │
│  │  │                         user interface                                  │
│  │  └─────────────────────────────────────────────────────┘  │  │──742
│  │  ┌─────────────────────────────────────────────────────┐  │  │
│  │  │ Display an animation of the first user interface replacing the second  │
│  │  │                         user interface                                  │
│  │  └─────────────────────────────────────────────────────┘  │  │
│  └───────────────────────────────────────────────────────────┘  │
└─────────────────────────────────────────────────────────────────┘
                                                                   ──744
┌─────────────────────────────────────────────────────────────────┐
│ The first user interface is in a first application and the second user interface is │
│                          in the first application                                │
└─────────────────────────────────────────────────────────────────┘
```

Figure 7B

DEVICE, METHOD, AND GRAPHICAL USER INTERFACE FOR SWITCHING BETWEEN TWO USER INTERFACES

RELATED APPLICATION

This application claims priority to U.S. Provisional Application Ser. No. 61/427,035, filed Dec. 23, 2010, entitled "Device, Method, and Graphical User Interface for Switching Between Two User Interfaces," which is incorporated herein by reference in its entirety.

This application is related to U.S. application Ser. No. 13/077,670, filed Mar. 31, 2011, entitled "Device, Method, and Graphical User Interface for Switching Between Two User Interfaces," which is incorporated herein by reference in its entirety.

TECHNICAL FIELD

This relates generally to electronic devices with touch-sensitive surfaces, including but not limited to electronic devices with touch-sensitive surfaces that switch back and forth between two user interfaces.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interfaces on a display.

In some cases, a user may want to access two related user interfaces. With existing methods, while one user interface is displayed, it may not be clear to the user how to access the second user interface. It may not even be apparent that there is a second user interface available to the user. For example, a user may need to search through one or more menus to activate a command that will display the second user interface. Such methods are cumbersome and inefficient. Such methods create a significant cognitive burden on a user. In addition, such methods take longer than necessary, thereby wasting energy. This latter consideration is particularly important in battery-operated devices.

SUMMARY

Accordingly, there is a need for electronic devices with faster, more efficient methods and interfaces for switching between two user interfaces. Such methods and interfaces may complement or replace conventional methods for switching between two user interfaces. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include authenticating, image editing, drawing, presenting, word processing, website creating, disk authoring, spreadsheet making, game playing, telephoning, video conferencing, e-mailing, instant messaging, workout support, digital photographing, digital videoing, web browsing, digital music playing, digital video playing, and/or inputting authentication credentials. Executable instructions for performing these functions may be included in a non-transitory computer readable storage medium or other computer program product configured for execution by one or more processors.

In accordance with some embodiments, a method is performed at an electronic device with a display and a touch-sensitive surface. The method includes: displaying a first authentication user interface on the display, the first authentication user interface including a text entry field for entering a text-based authentication code; detecting a first input by a user on the touch-sensitive surface while displaying the first authentication user interface; in response to detecting the first input, displaying a second authentication user interface on the display, distinct from the first authentication user interface, the second authentication user interface configured for entering a gesture-based authentication code; while displaying the second authentication user interface, detecting one or more gestures by the user at locations on the touch-sensitive surface that correspond to locations on the second authentication user interface; and authenticating the user in accordance with a determination that the detected one or more gestures correspond to a gesture-based authentication code for the user.

In accordance with some embodiments, a method is performed at an electronic device with a display and a touch-sensitive surface. The method includes: displaying a first user interface on the display, the first user interface including a graphical object at a first location on the display; while displaying the first user interface, detecting a first gesture by a user on the touch-sensitive surface, the first gesture starting at a location on the touch-sensitive surface that corresponds to the first location of the graphical object on the display; in response to detecting the first gesture: moving the graphical object across the display to a second location on the display, distinct from the first location, and displaying a second user interface on the display, distinct from the first user interface, the second user interface including the graphical object at the second location on the display; while displaying the second user interface, detecting a second gesture by the user on the touch-sensitive surface, the second gesture starting at a location on the touch-sensitive surface that corresponds to the second location of the graphical object on the display; and, in response to detecting the second gesture: moving the graphical object across the display to the first location on the display, and displaying the first user interface on the display.

In accordance with some embodiments, an electronic device includes a display, a touch-sensitive surface, one or more processors, memory, and one or more programs. The one or more programs are stored in the memory and configured to be executed by the one or more processors. The one or more programs include instructions for: displaying a first authentication user interface on the display, the first authentication user interface including a text entry field for entering a text-based authentication code; detecting a first input by a user on the touch-sensitive surface while displaying the first authentication user interface; in response to detecting the first input, displaying a second authentication user interface on the display, distinct from the first authentication user interface, the second authentication user interface configured for entering a gesture-based authentication code; while displaying the second authentication user interface, detecting one or more gestures by the user at locations on the touch-sensitive surface that correspond to locations on the second authentication user interface; and authenticating the user in accordance with a determination that the detected one or more gestures correspond to a gesture-based authentication code for the user.

In accordance with some embodiments, an electronic device includes a display, a touch-sensitive surface, one or more processors, memory, and one or more programs. The one or more programs are stored in the memory and configured to be executed by the one or more processors. The one or more programs include instructions for: displaying a first user interface on the display, the first user interface including a graphical object at a first location on the display; while displaying the first user interface, detecting a first gesture by a user on the touch-sensitive surface, the first gesture starting at a location on the touch-sensitive surface that corresponds to the first location of the graphical object on the display; in response to detecting the first gesture: moving the graphical object across the display to a second location on the display, distinct from the first location, and displaying a second user interface on the display, distinct from the first user interface, the second user interface including the graphical object at the second location on the display; while displaying the second user interface, detecting a second gesture by the user on the touch-sensitive surface, the second gesture starting at a location on the touch-sensitive surface that corresponds to the second location of the graphical object on the display; and, in response to detecting the second gesture: moving the graphical object across the display to the first location on the display, and displaying the first user interface on the display.

In accordance with some embodiments, a non-transitory computer readable storage medium has stored therein instructions which when executed by an electronic device with a display and a touch-sensitive surface, cause the device to: display a first authentication user interface on the display, the first authentication user interface including a text entry field for entering a text-based authentication code; detect a first input by a user on the touch-sensitive surface while displaying the first authentication user interface; in response to detecting the first input, display a second authentication user interface on the display, distinct from the first authentication user interface, the second authentication user interface configured for entering a gesture-based authentication code; while displaying the second authentication user interface, detect one or more gestures by the user at locations on the touch-sensitive surface that correspond to locations on the second authentication user interface; and authenticate the user in accordance with a determination that the detected one or more gestures correspond to a gesture-based authentication code for the user.

In accordance with some embodiments, a non-transitory computer readable storage medium has stored therein instructions which when executed by an electronic device with a display and a touch-sensitive surface, cause the device to: display a first user interface on the display, the first user interface including a graphical object at a first location on the display; while displaying the first user interface, detect a first gesture by a user on the touch-sensitive surface, the first gesture starting at a location on the touch-sensitive surface that corresponds to the first location of the graphical object on the display; in response to detecting the first gesture: move the graphical object across the display to a second location on the display, distinct from the first location, and display a second user interface on the display, distinct from the first user interface, the second user interface including the graphical object at the second location on the display; while displaying the second user interface, detect a second gesture by the user on the touch-sensitive surface, the second gesture starting at a location on the touch-sensitive surface that corresponds to the second location of the graphical object on the display; and, in response to detecting the second gesture: move the graphical object across the display to the first location on the display, and display the first user interface on the display.

In accordance with some embodiments, a graphical user interface on an electronic device with a display, a touch-sensitive surface, a memory, and one or more processors to execute one or more programs stored in the memory includes a first authentication user interface on the display, the first authentication user interface including a text entry field for entering a text-based authentication code. A first input by a user is detected on the touch-sensitive surface while displaying the first authentication user interface. In response to detecting the first input, a second authentication user interface is displayed on the display, distinct from the first authentication user interface, the second authentication user interface configured for entering a gesture-based authentication code. While displaying the second authentication user interface, one or more gestures by the user are detected at locations on the touch-sensitive surface that correspond to locations on the second authentication user interface. The user is authenticated in accordance with a determination that the detected one or more gestures correspond to a gesture-based authentication code for the user.

In accordance with some embodiments, a graphical user interface on an electronic device with a display, a touch-sensitive surface, a memory, and one or more processors to execute one or more programs stored in the memory includes a first user interface on the display, the first user interface including a graphical object at a first location on the display. While displaying the first user interface, a first gesture by a user is detected on the touch-sensitive surface, the first gesture starting at a location on the touch-sensitive surface that corresponds to the first location of the graphical object on the display. In response to detecting the first gesture: the graphical object is moved across the display to a second location on the display, distinct from the first location, and a second user interface is displayed on the display, distinct from the first user interface, the second user interface including the graphical object at the second location on the display. While displaying the second user interface, a second gesture by the user is detected on the touch-sensitive surface, the second gesture starting at a location on the touch-sensitive surface that corresponds to the second location of the graphical object on the display. In response to detecting the second gesture: the graphical object is moved across the display to the first location on the display, and the first user interface is displayed on the display.

In accordance with some embodiments, an electronic device includes: a display; a touch-sensitive surface; means for displaying a first authentication user interface on the display, the first authentication user interface including a text entry field for entering a text-based authentication code; means for detecting a first input by a user on the touch-sensitive surface while displaying the first authentication user interface; means, enabled in response to detecting the first input, for displaying a second authentication user interface on the display, distinct from the first authentication user interface, the second authentication user interface configured for entering a gesture-based authentication code; means, enabled while displaying the second authentication user interface, for detecting one or more gestures by the user at locations on the touch-sensitive surface that correspond to locations on the second authentication user interface; and means for authenticating the user in accordance with a determination that the detected one or more gestures correspond to a gesture-based authentication code for the user.

In accordance with some embodiments, an electronic device includes: a display; a touch-sensitive surface; means for displaying a first user interface on the display, the first user interface including a graphical object at a first location on the display; means, enabled while displaying the first user interface, for detecting a first gesture by a user on the touch-sensitive surface, the first gesture starting at a location on the touch-sensitive surface that corresponds to the first location of the graphical object on the display; means, enabled in response to detecting the first gesture, including: means for moving the graphical object across the display to a second location on the display, distinct from the first location, and means for displaying a second user interface on the display, distinct from the first user interface, the second user interface including the graphical object at the second location on the display; means, enabled while displaying the second user interface, for detecting a second gesture by the user on the touch-sensitive surface, the second gesture starting at a location on the touch-sensitive surface that corresponds to the second location of the graphical object on the display; and means, enabled in response to detecting the second gesture, including: means for moving the graphical object across the display to the first location on the display, and means for displaying the first user interface on the display.

In accordance with some embodiments, an information processing apparatus for use in an electronic device with a display and a touch-sensitive surface includes: means for displaying a first authentication user interface on the display, the first authentication user interface including a text entry field for entering a text-based authentication code; means for detecting a first input by a user on the touch-sensitive surface while displaying the first authentication user interface; means, enabled in response to detecting the first input, for displaying a second authentication user interface on the display, distinct from the first authentication user interface, the second authentication user interface configured for entering a gesture-based authentication code; means, enabled while displaying the second authentication user interface, for detecting one or more gestures by the user at locations on the touch-sensitive surface that correspond to locations on the second authentication user interface; and means for authenticating the user in accordance with a determination that the detected one or more gestures correspond to a gesture-based authentication code for the user.

In accordance with some embodiments, an information processing apparatus for use in an electronic device with a display and a touch-sensitive surface includes: means for displaying a first user interface on the display, the first user interface including a graphical object at a first location on the display; means, enabled while displaying the first user interface, for detecting a first gesture by a user on the touch-sensitive surface, the first gesture starting at a location on the touch-sensitive surface that corresponds to the first location of the graphical object on the display; means, enabled in response to detecting the first gesture, including: means for moving the graphical object across the display to a second location on the display, distinct from the first location, and means for displaying a second user interface on the display, distinct from the first user interface, the second user interface including the graphical object at the second location on the display; means, enabled while displaying the second user interface, for detecting a second gesture by the user on the touch-sensitive surface, the second gesture starting at a location on the touch-sensitive surface that corresponds to the second location of the graphical object on the display; and means, enabled in response to detecting the second gesture, including: means for moving the graphical object across the display to the first location on the display, and means for displaying the first user interface on the display.

In accordance with some embodiments, an electronic device includes a display unit configured to display a first authentication user interface, the first authentication user interface including a text entry field for entering a text-based authentication code; a touch-sensitive surface unit configured to receive user inputs; and a processing unit coupled to the display unit and the touch-sensitive surface unit. The processing unit is configured to: detect a first input by a user on the touch-sensitive surface unit while the display unit displays the first authentication user interface; in response to detecting the first input, enable display of a second authentication user interface on the display unit, distinct from the first authentication user interface, the second authentication user interface configured for entering a gesture-based authentication code; while the display unit displays the second authentication user interface, detect one or more gestures by the user at locations on the touch-sensitive surface unit that correspond to locations on the second authentication user interface; and authenticate the user in accordance with a determination that the detected one or more gestures correspond to a gesture-based authentication code for the user.

In accordance with some embodiments, an electronic device includes a display unit configured to display a first user interface, the first user interface including a graphical object at a first location on the display unit; a touch-sensitive surface unit configured to receive gestures; and a processing unit coupled to the display unit and the touch-sensitive surface unit. The processing unit is configured to: while the display unit displays the first user interface, detect a first gesture by a user on the touch-sensitive surface unit, the first gesture starting at a location on the touch-sensitive surface unit that corresponds to the first location of the graphical object on the display unit; in response to detecting the first gesture: move the graphical object across the display unit to a second location on the display unit, distinct from the first location; and enable display of a second user interface on the display unit, distinct from the first user interface, the second user interface including the graphical object at the second location on the display unit; while the display unit displays the second user interface, detect a second gesture by the user on the touch-sensitive surface unit, the second gesture starting at a location on the touch-sensitive surface unit that corresponds to the second location of the graphical object on the display unit; and, in response to detecting the second gesture: move the graphical object across the display unit to the first location on the display unit; and enable display of the first user interface on the display unit.

Thus, electronic devices with displays and touch-sensitive surfaces are provided with faster, more efficient methods and interfaces for switching between two user interfaces (e.g., switching between two authentication user interfaces), thereby increasing the effectiveness, efficiency, and user satisfaction with such devices. Such methods and interfaces may complement or replace conventional methods for switching between two user interfaces.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIG. 7A-7B are flow diagrams illustrating a method of switching between a first user interface and a second user interface in accordance with some embodiments.

DESCRIPTION OF EMBODIMENTS

Described below are devices and methods that enable a user to easily toggle between two user interfaces. For example, for authentication, the device toggles between a text-based authentication user interface and a gesture-based authentication user interface. The two user interfaces typically contain a common graphical object that moves from one location in the first user interface (e.g., next to the top of the display) to a second location in the second user interface (e.g., next to the bottom of the display). The switch between the two user interfaces is typically initiated by a gesture on a touch-sensitive surface at a location that corresponds to the current location of the graphical object on the display. The movement and continuous display of the graphical object in both the first and second user interfaces helps to remind a user how to go back and forth (toggle) between the two interfaces. The movement and display of the common graphical object typically indicates a relative spatial relationship between the two user interfaces in a displayed application.

Figure 6A:
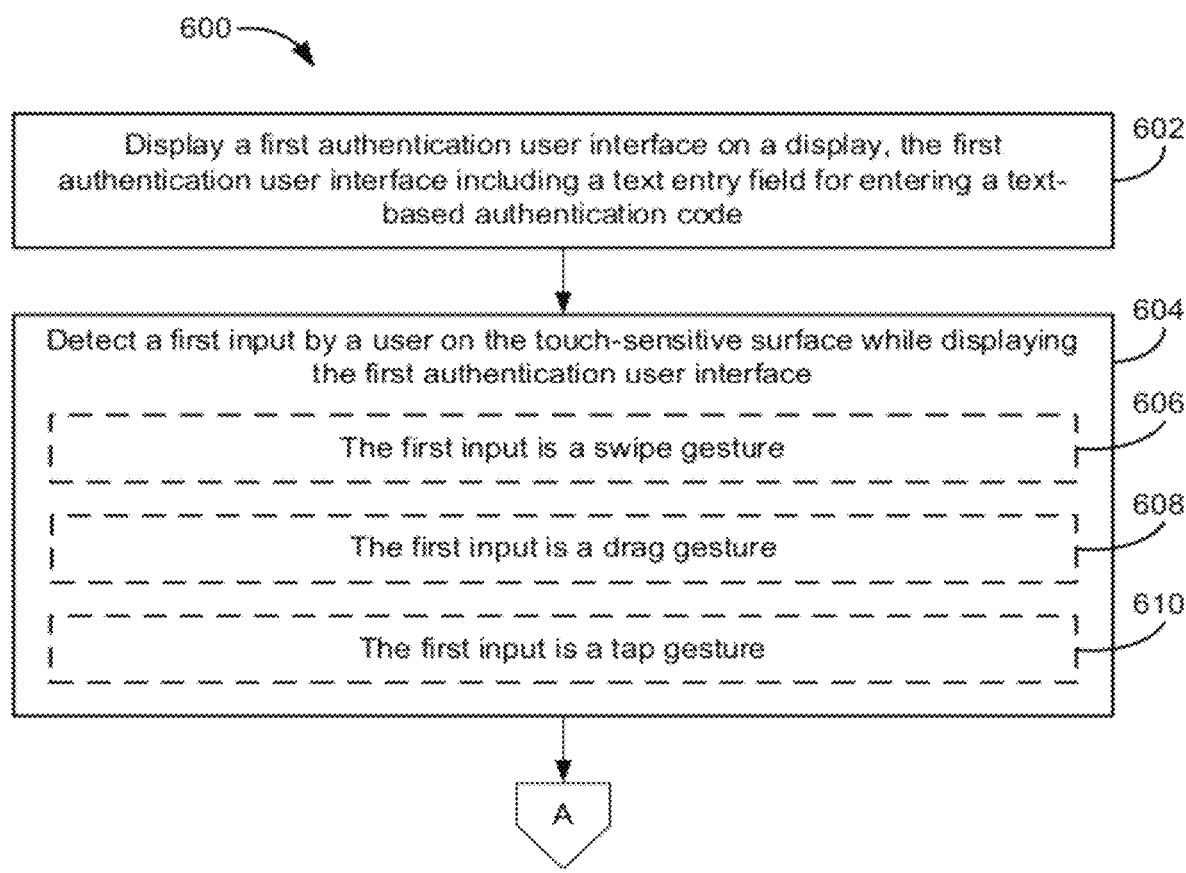
FIGS. 6A-6C are flow diagrams illustrating a method of switching between a text-based authentication user interface and a gesture-based authentication user interface in accordance with some embodiments.
Figure 6B:
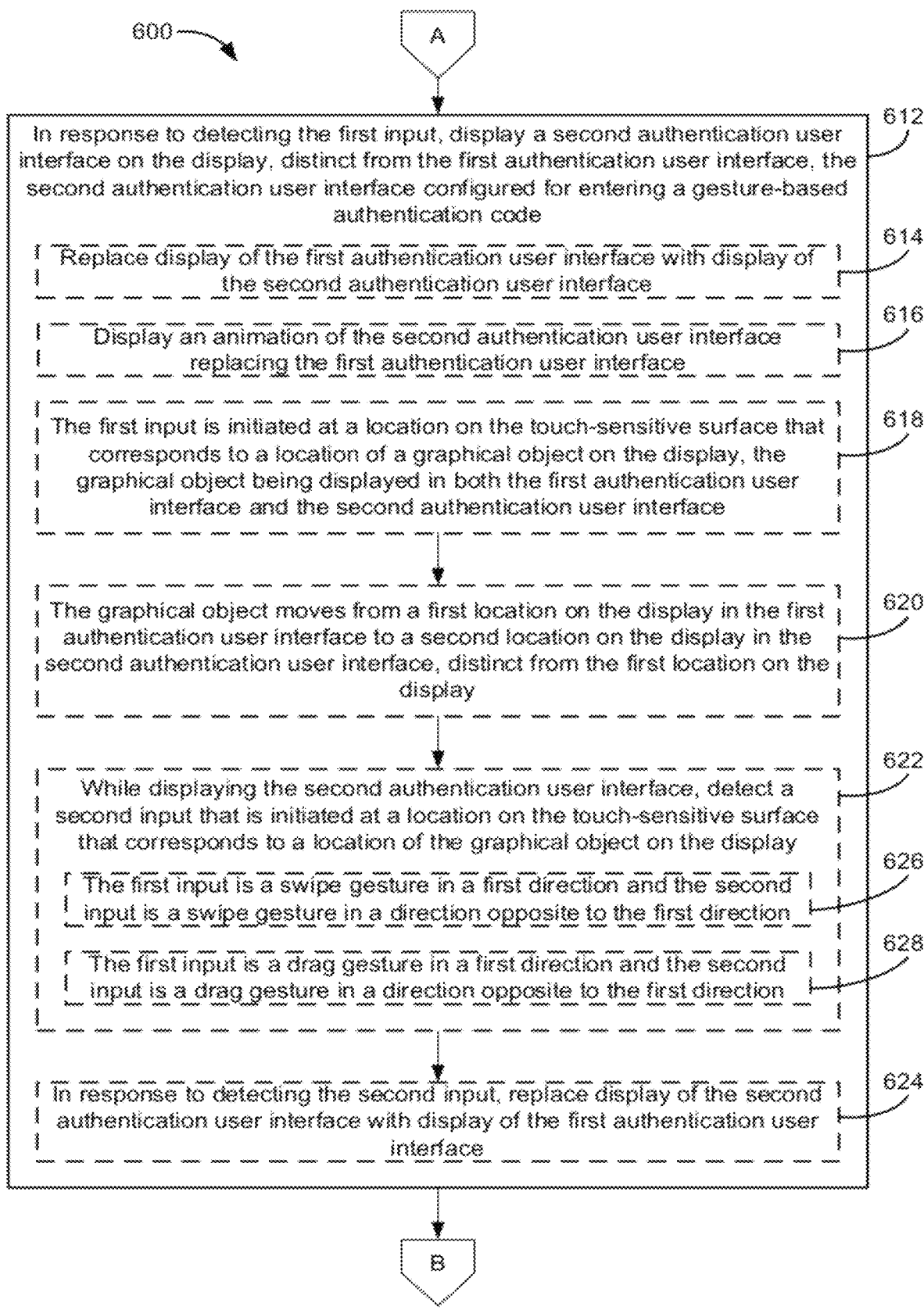
Figure 6C:
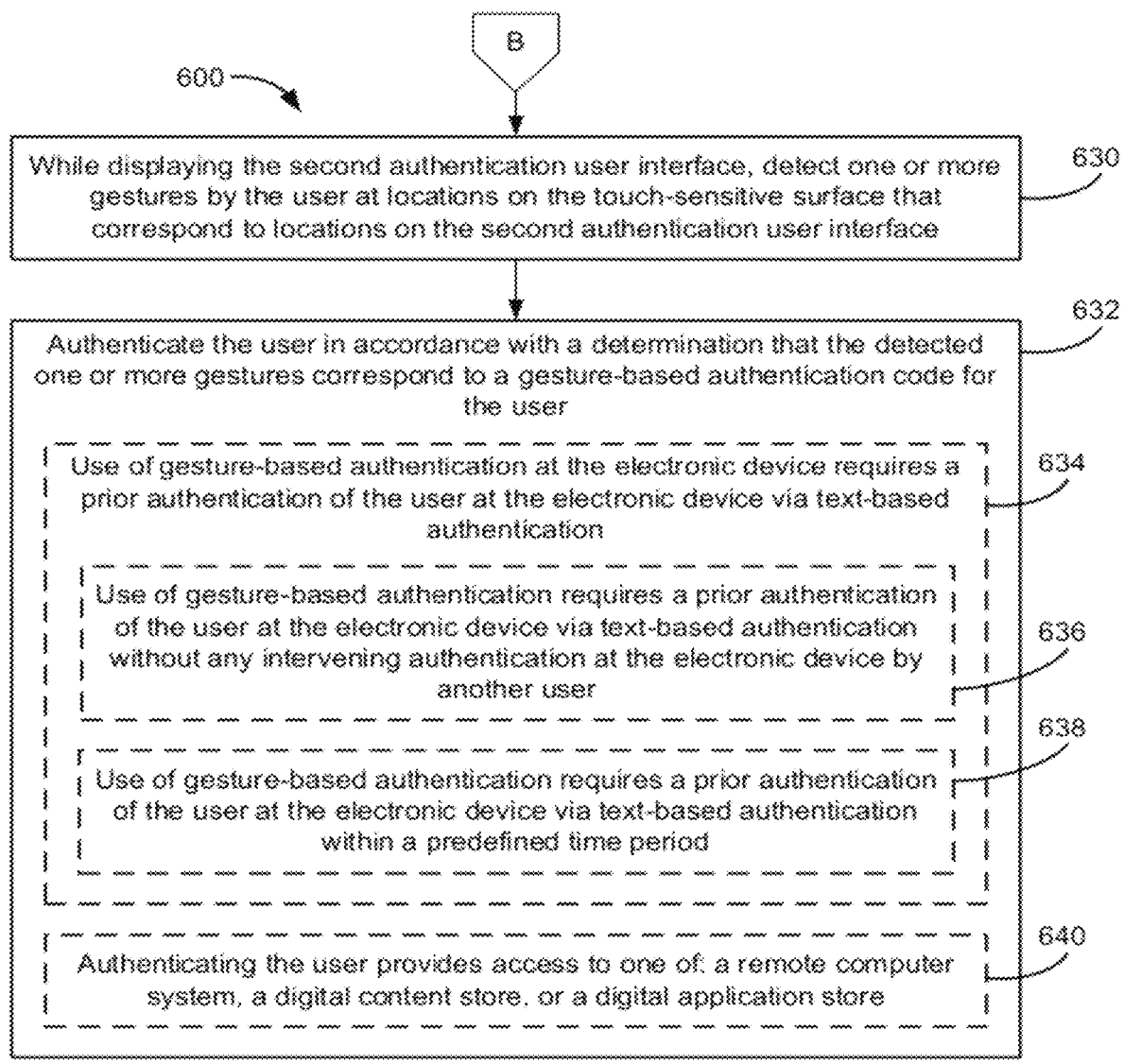
Figure 7A:
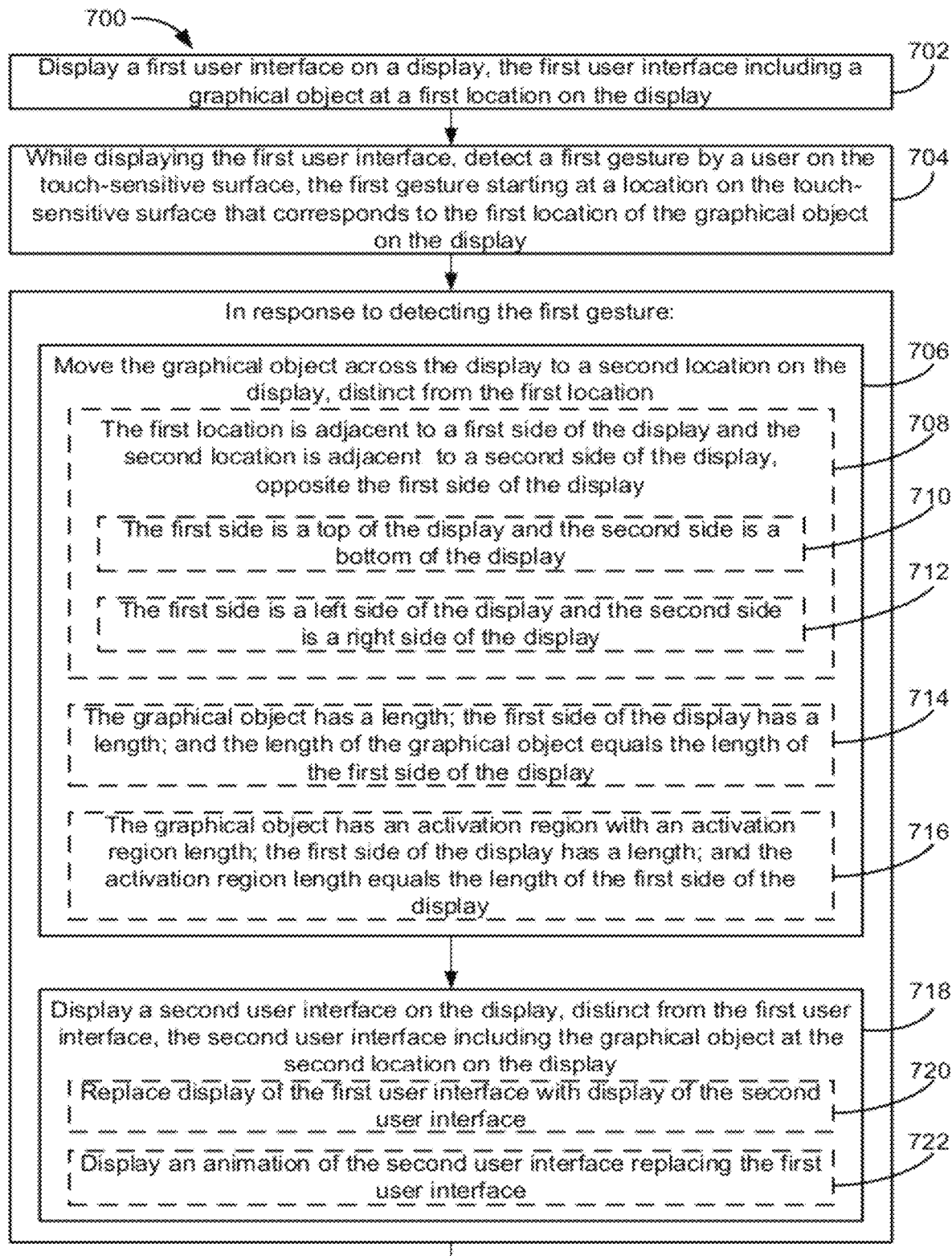

Below, FIGS. 1A-1B, 2, 3, 8, and 9 provide a description of exemplary devices. FIGS. 4A-4B and 5A-5S illustrate exemplary user interfaces for switching between a first user interface and a second user interface. FIGS. 6A-6C are flow diagrams illustrating a method of switching between a text-based authentication user interface and a gesture-based authentication user interface. The user interfaces in FIGS. 5A-5I are used to illustrate the processes in FIGS. 6A-6C. FIGS. 7A-7B are flow diagrams illustrating a method of switching between a first user interface and a second user interface. The user interfaces in FIGS. 5J-5S are used to illustrate the processes in FIGS. 7A-7B.

EXEMPLARY DEVICES

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Figure 1A:
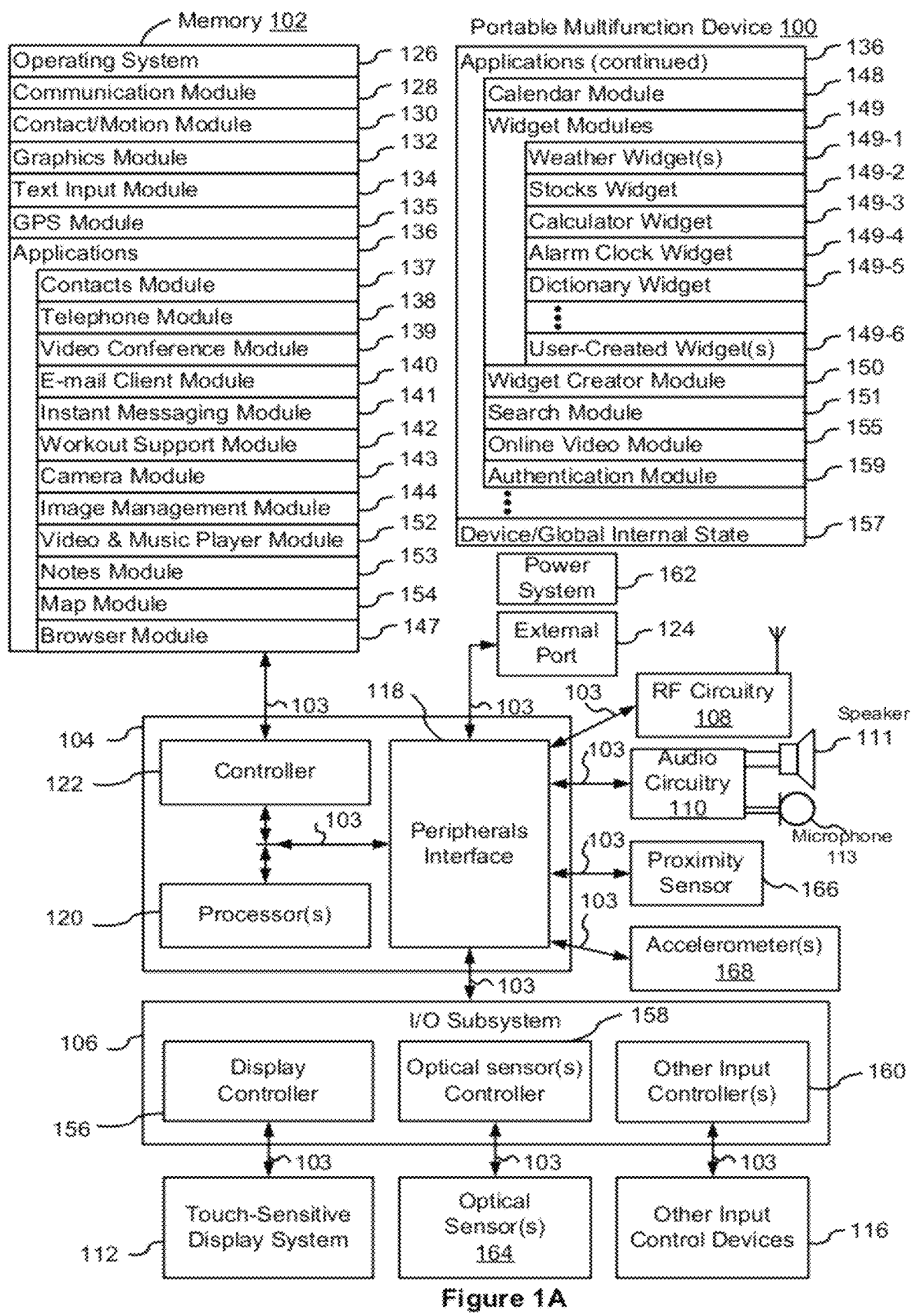
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more non-transitory computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIG. 1A may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the multifunction device is placed near the user's ear (e.g., when the user is making a phone call).

Device 100 may also include one or more accelerometers 168. FIG. 1A shows accelerometer 168 coupled to peripherals interface 118. Alternately, accelerometer 168 may be coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
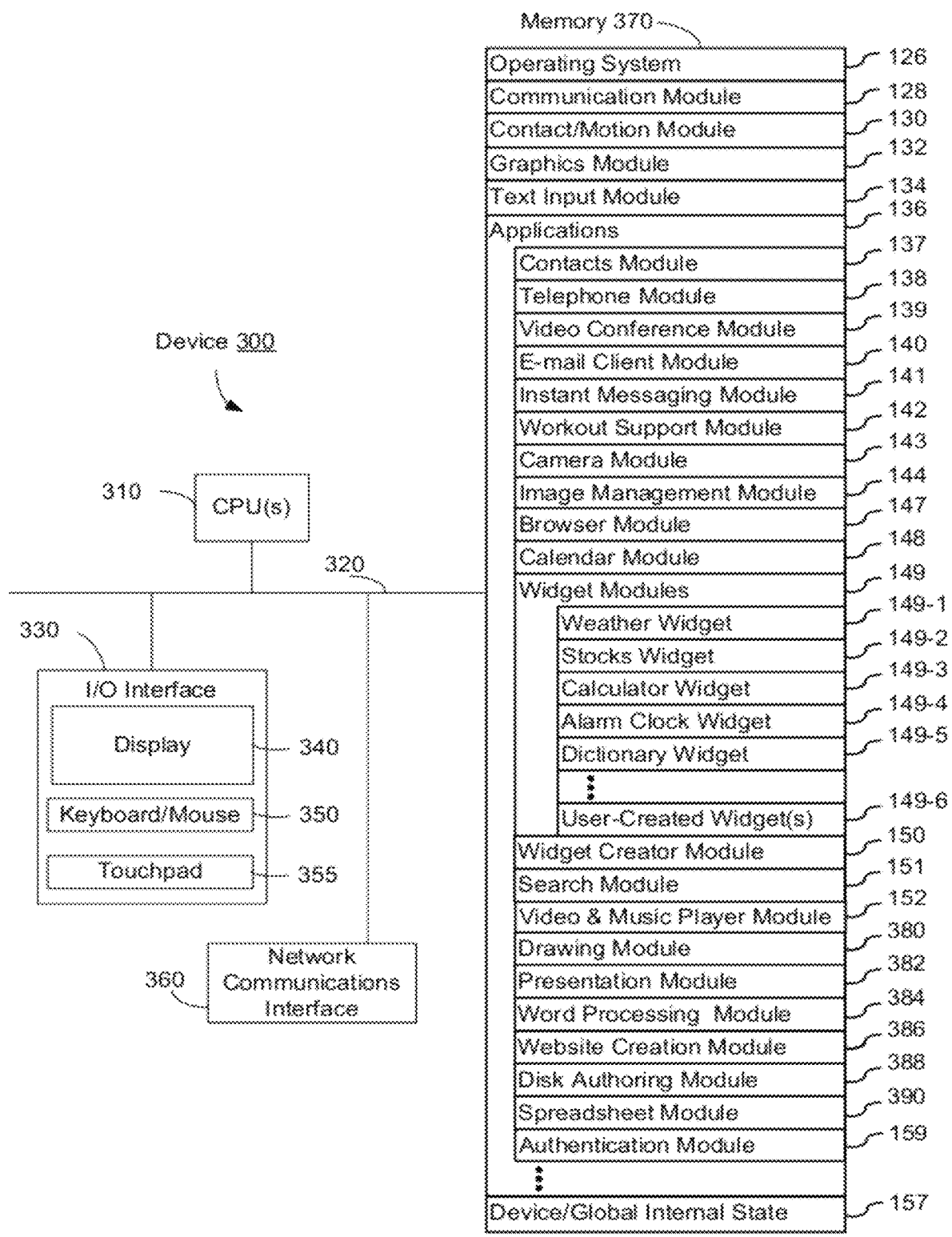
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components. Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which may be made up of a video player module and a music player module;
- notes module 153;
- map module 154;
- online video module 155; and/or
- authentication module 159.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names;

providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

In conjunction with touch screen 112, display system controller 156, contact module 130, graphics module 132, text input module 134, and optionally other modules such as email client module 140 or browser module 147, authentication module 159 includes instructions that allow the user to input, modify, and reset authentication credentials for a network, system, device, service, or store.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 1B:
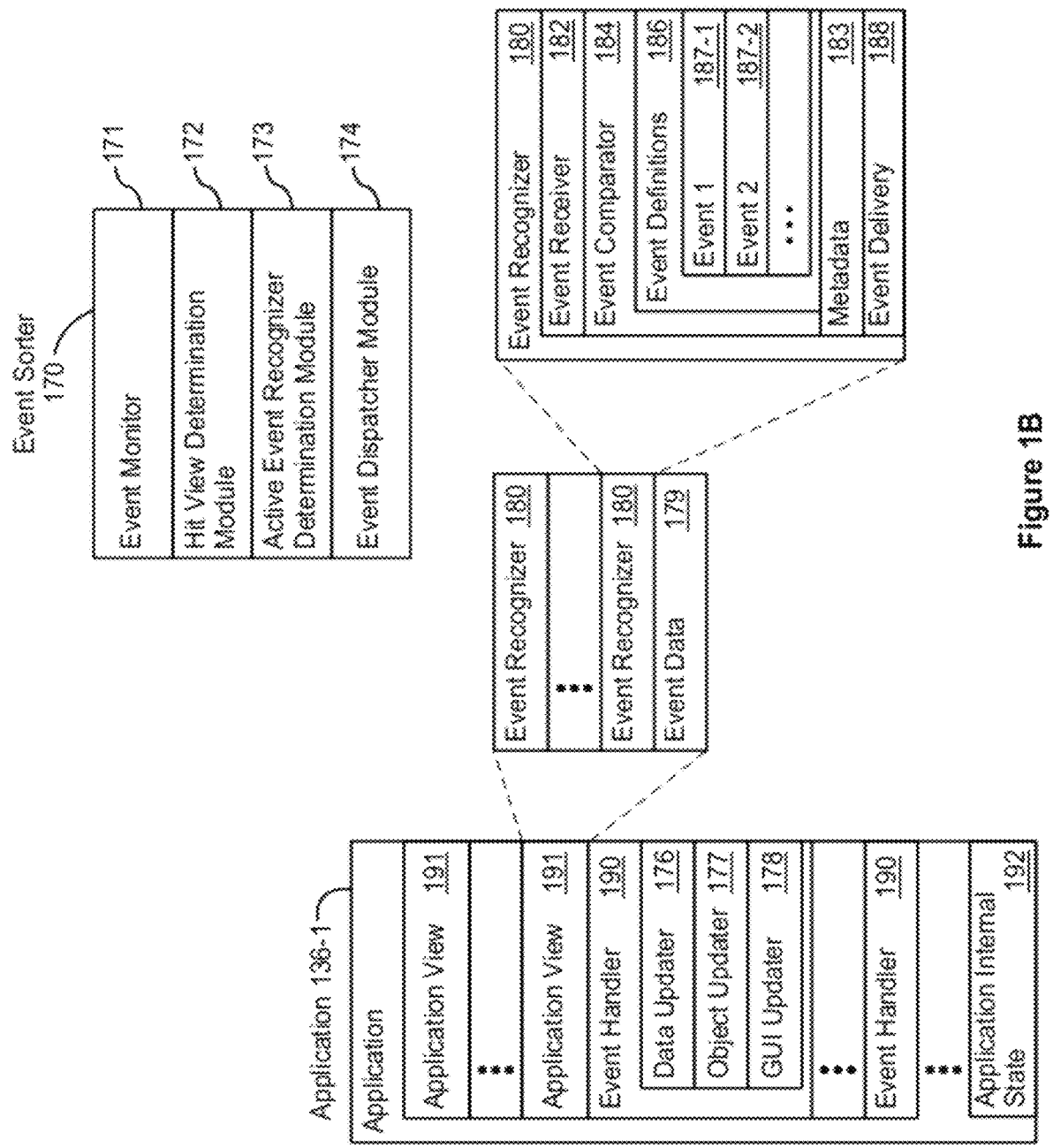
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182. In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 2:
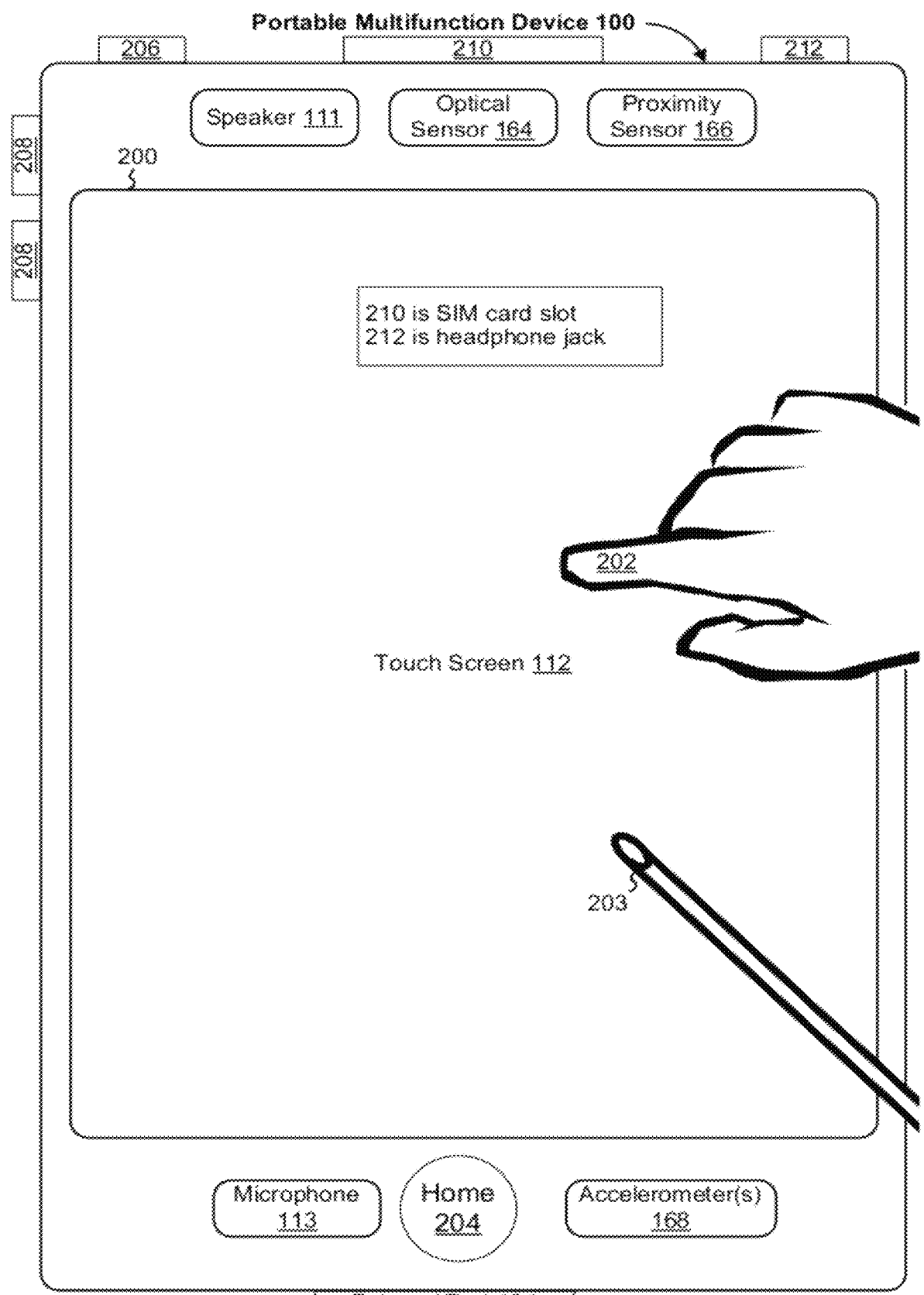
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture may include one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 may include circuitry (sometimes called a chipset) that interconnects and controls communications between system components. Device 300 includes input/output (I/O) interface 330 comprising display 340, which is typically a touch screen display. I/O interface 330 also may include a keyboard and/or mouse (or other pointing device) 350 and touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from CPU(s) 310. In some embodiments, memory 370 stores programs, modules, and data structures analogous to the programs, modules, and data structures stored in memory 102 of portable multifunction device 100 (FIG. 1), or a subset thereof. Furthermore, memory 370 may store additional programs, modules, and data structures not present in memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on portable multifunction device 100.

Figure 4A:
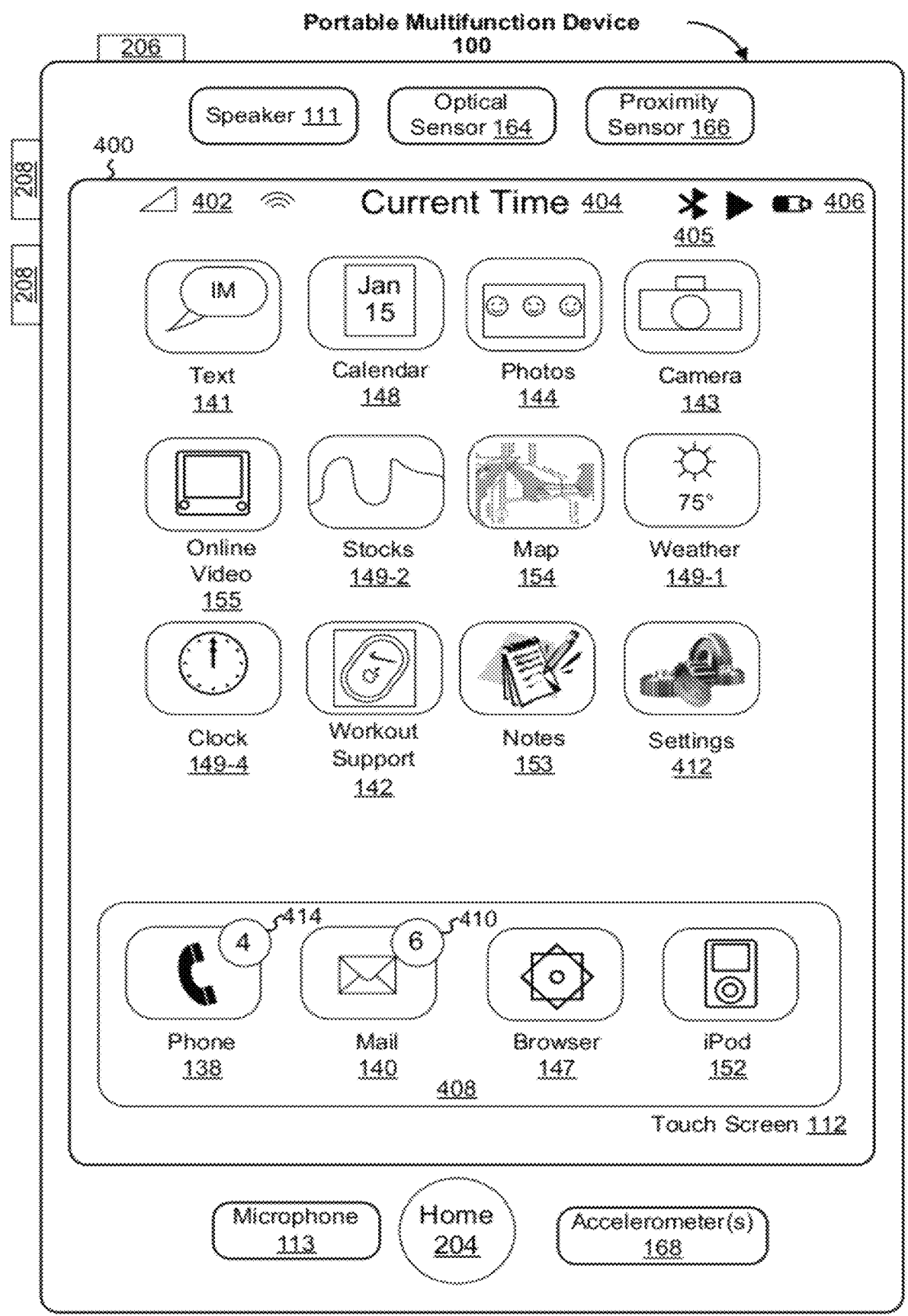
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Phone 138, which may include an indicator 414 of the number of missed calls or voicemail messages;
  E-mail client 140, which may include an indicator 410 of the number of unread e-mails;
  Browser 147; and
  Video and music player 152, also referred to as iPod (trademark of Apple Inc.) module 152; and
Icons for other applications, such as:
  IM 141;
  Image management 144;
  Camera 143;
  Weather 149-1;
  Stocks 149-2;
  Workout support 142;
  Calendar 148;
  Alarm clock 149-4;
  Map 154;
  Notes 153;
  Settings 412, which provides access to settings for device 100 and its various applications 136; and
  Online video module 155, also referred to as YouTube (trademark of Google Inc.) module 155.

Figure 4B:
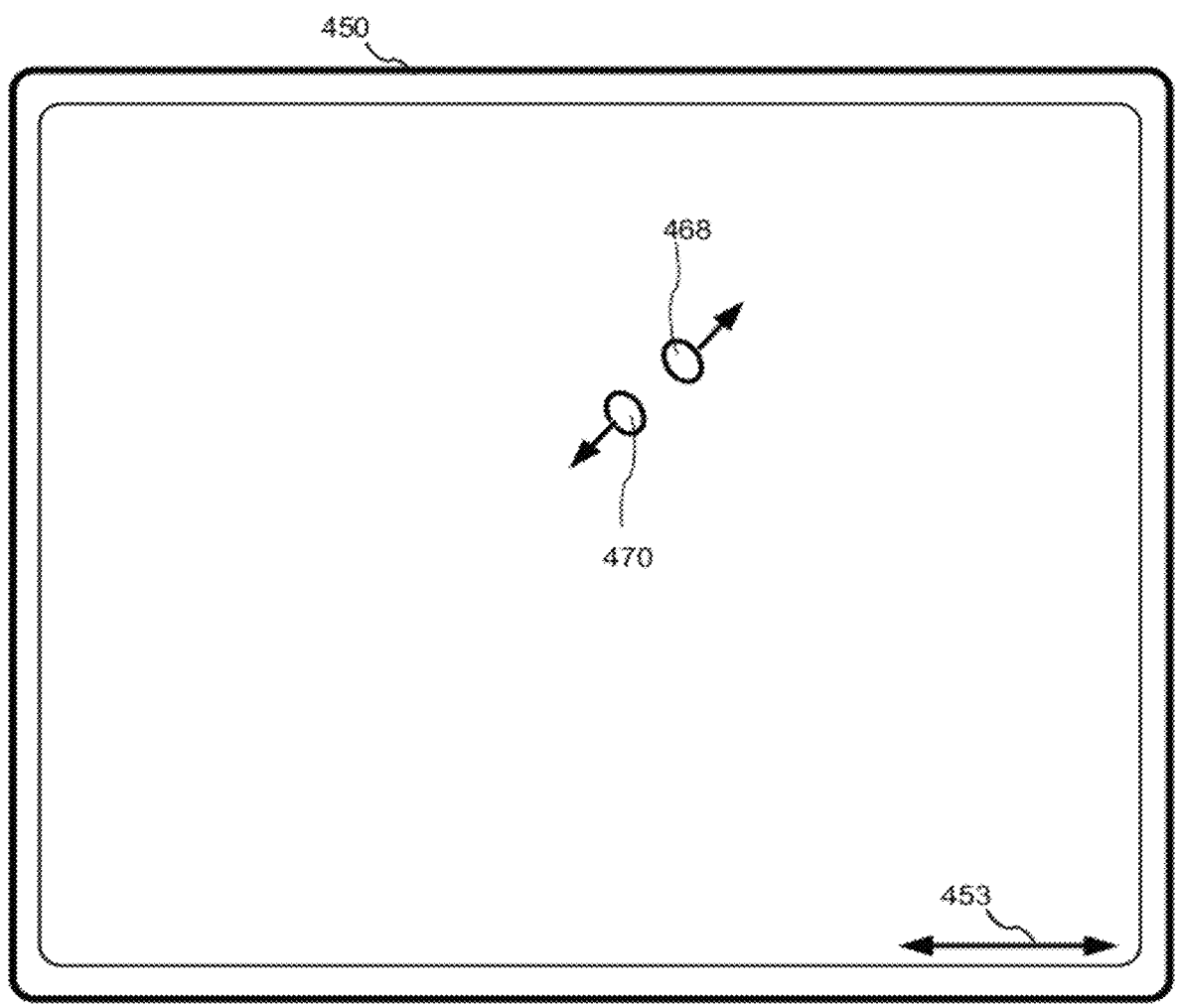
FIG. 4B illustrates an exemplary user interface for a multifunction device with a touch-sensitive surface that is separate from the display in accordance with some embodiments.
Figure 4B:
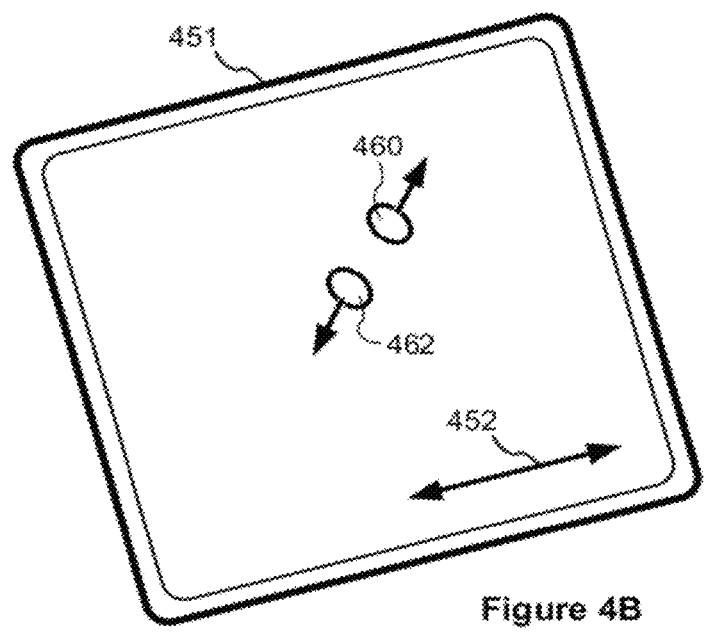

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Although many of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods may be used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture may be replaced with a mouse click (e.g., instead of a contact) followed by movement of the cursor along the path of the swipe (e.g., instead of movement of the contact). As another example, a tap gesture may be replaced with a mouse click while the cursor is located over the location of the tap gesture (e.g., instead of detection of the contact followed by ceasing to detect the contact).

USER INTERFACES AND ASSOCIATED PROCESSES attention is now directed towards embodiments of user interfaces ("UI") and associated processes that may be implemented on an electronic device with a display and a touch-sensitive surface, such as device 300 or portable multifunction device 100.

Figure 5A:
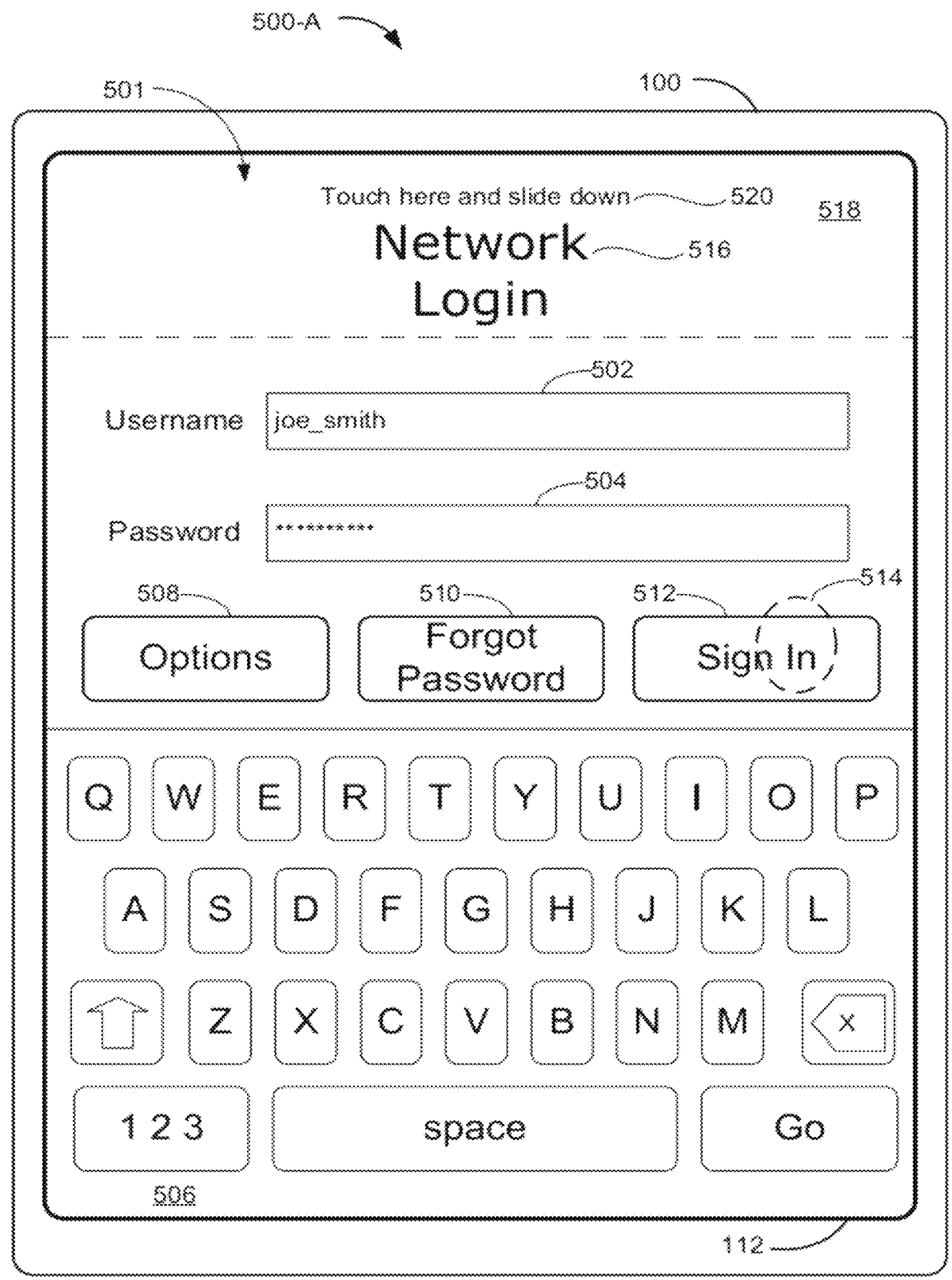
FIGS. 5A-5S illustrate exemplary user interfaces for switching between user interfaces, including switching between a text-based authentication user interface and a gesture-based authentication user interface, in accordance with some embodiments.
Figure 5B:
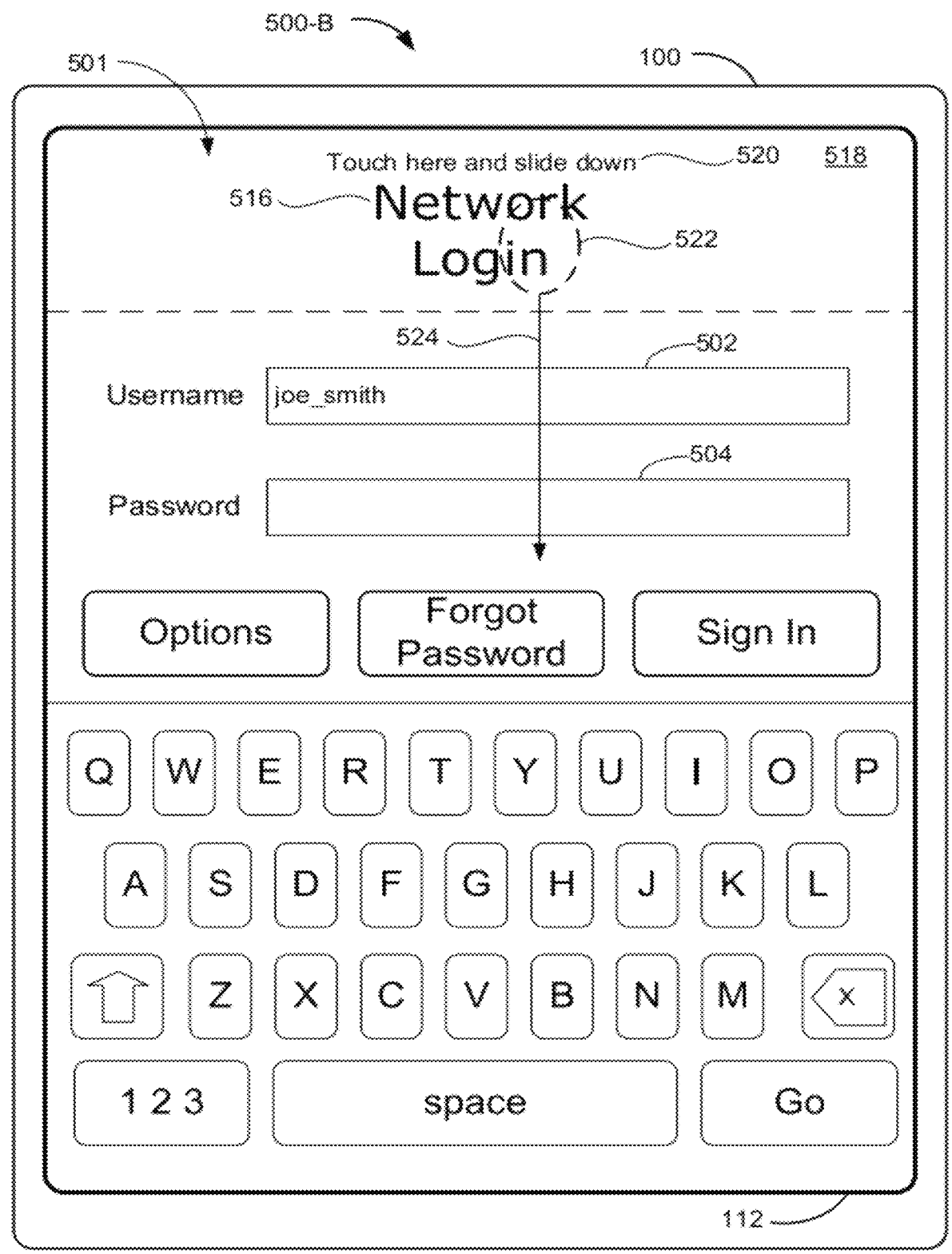
Figure 5C:
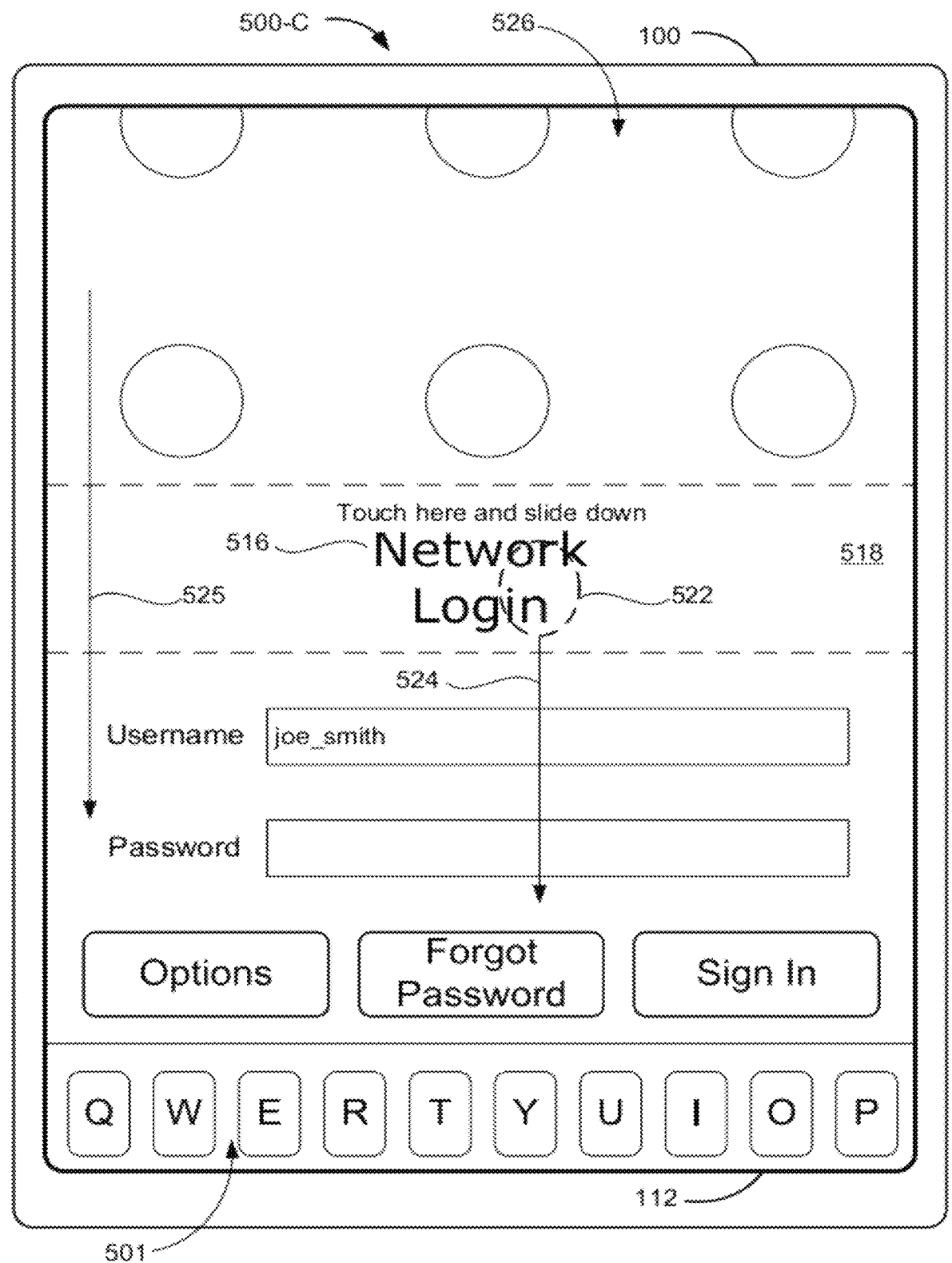
Figure 5D:
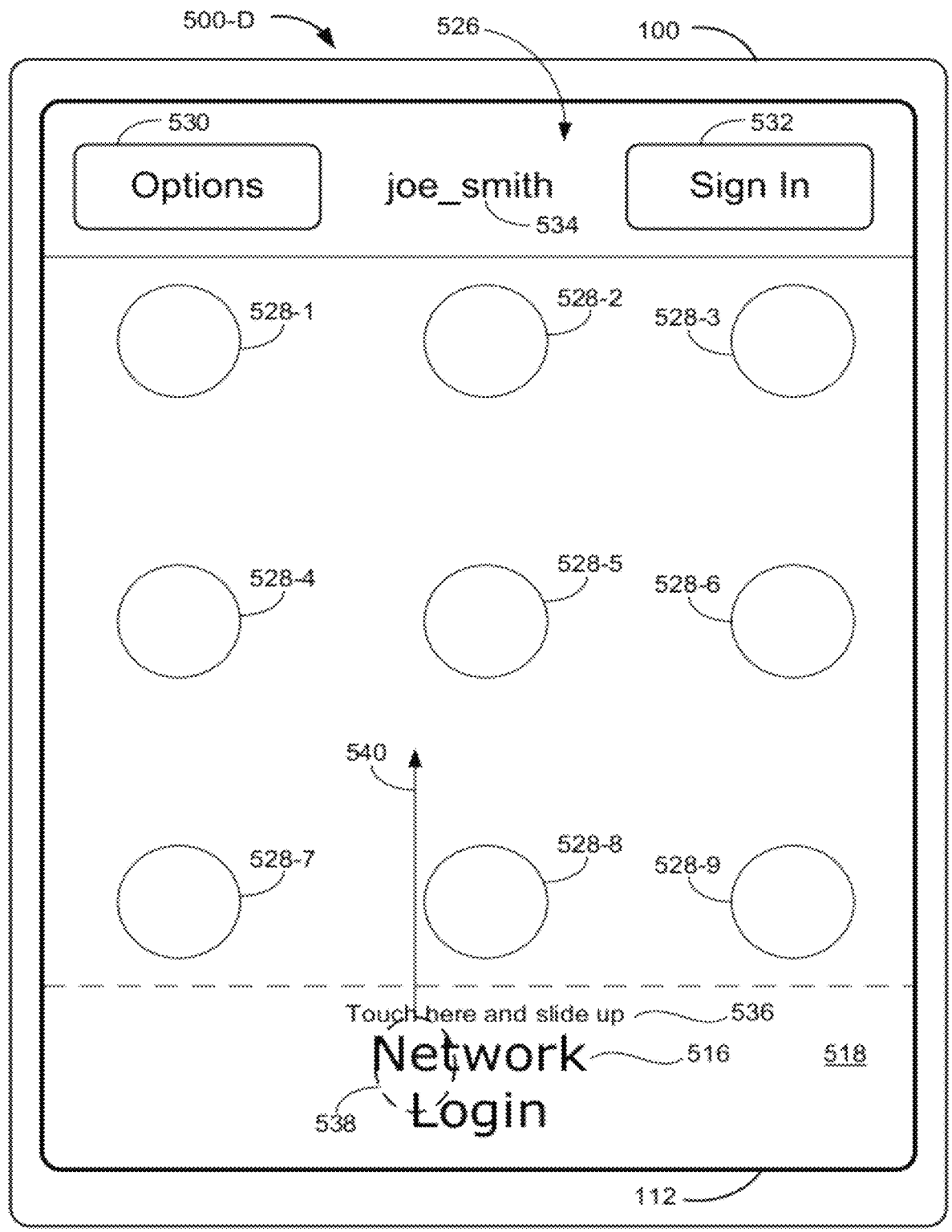
Figure 5E:
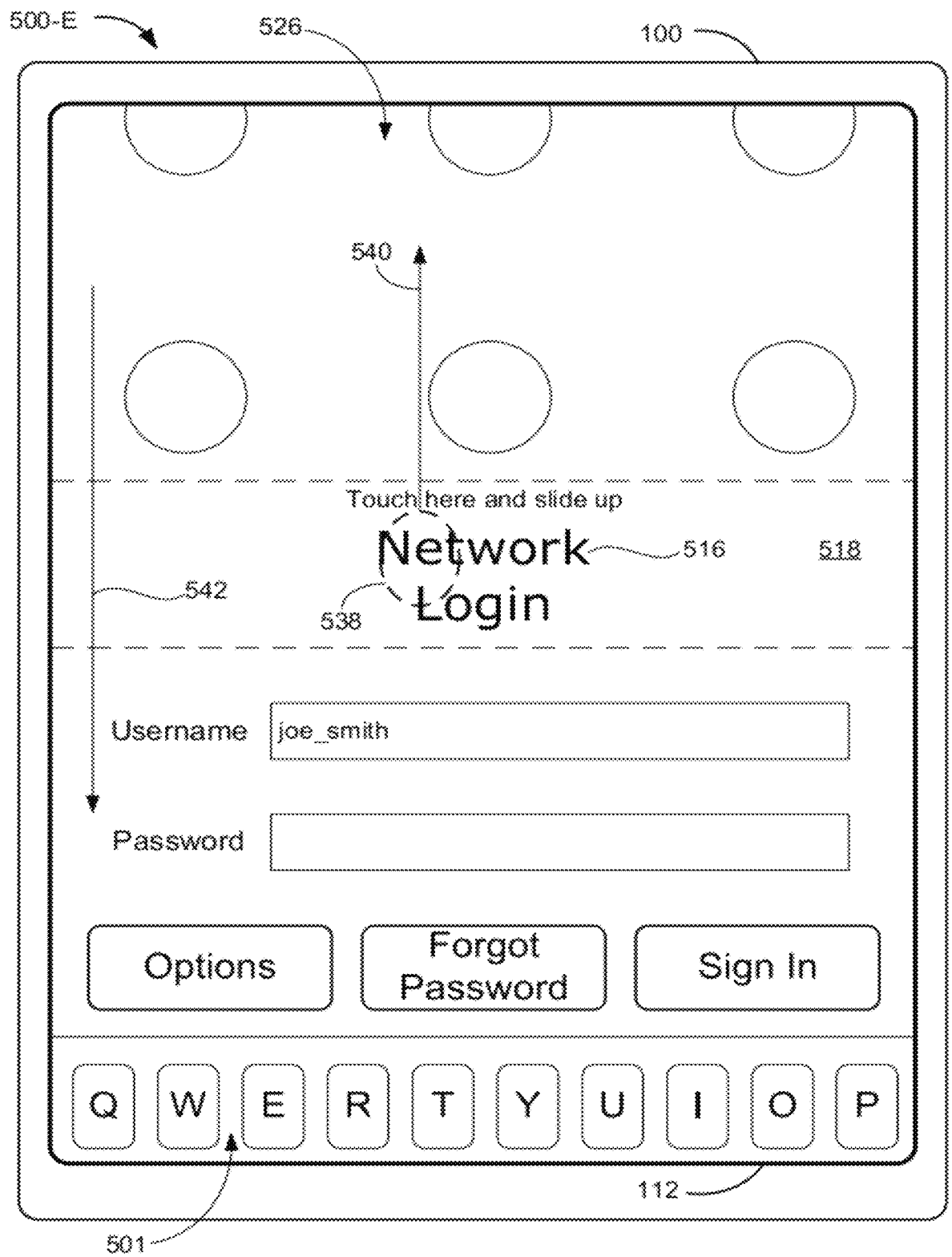
Figure 5F:
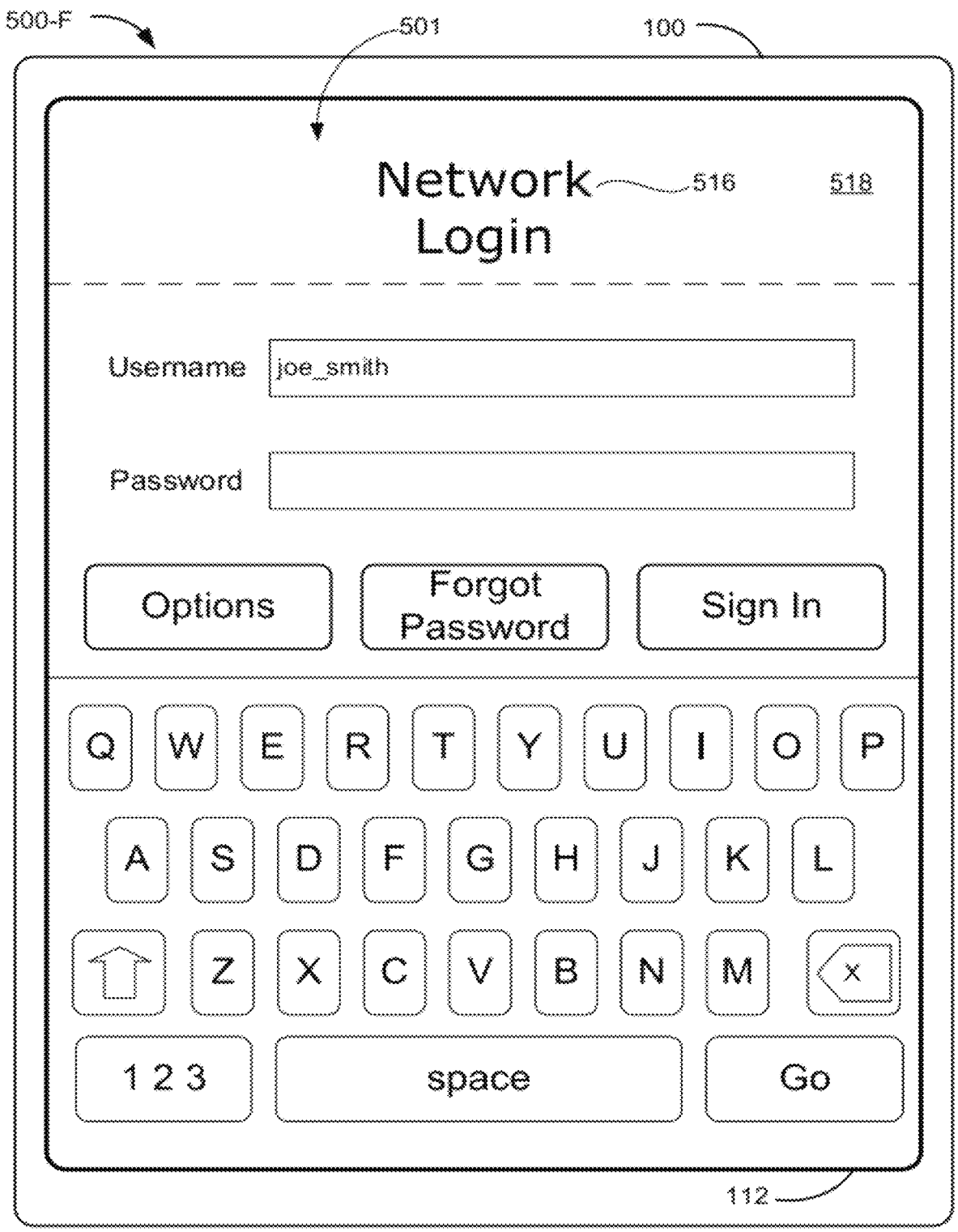
Figure 5G:
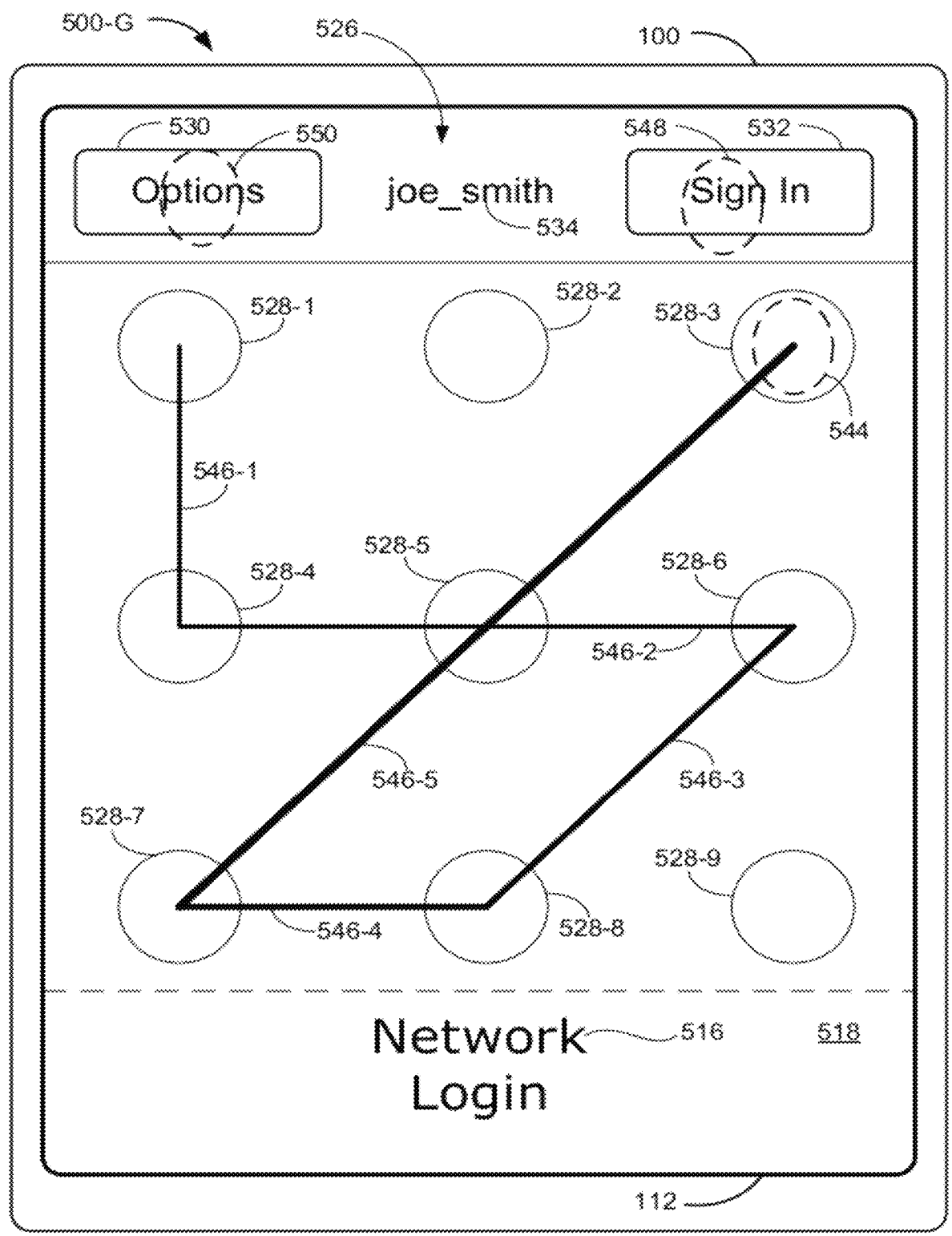
Figure 5H:
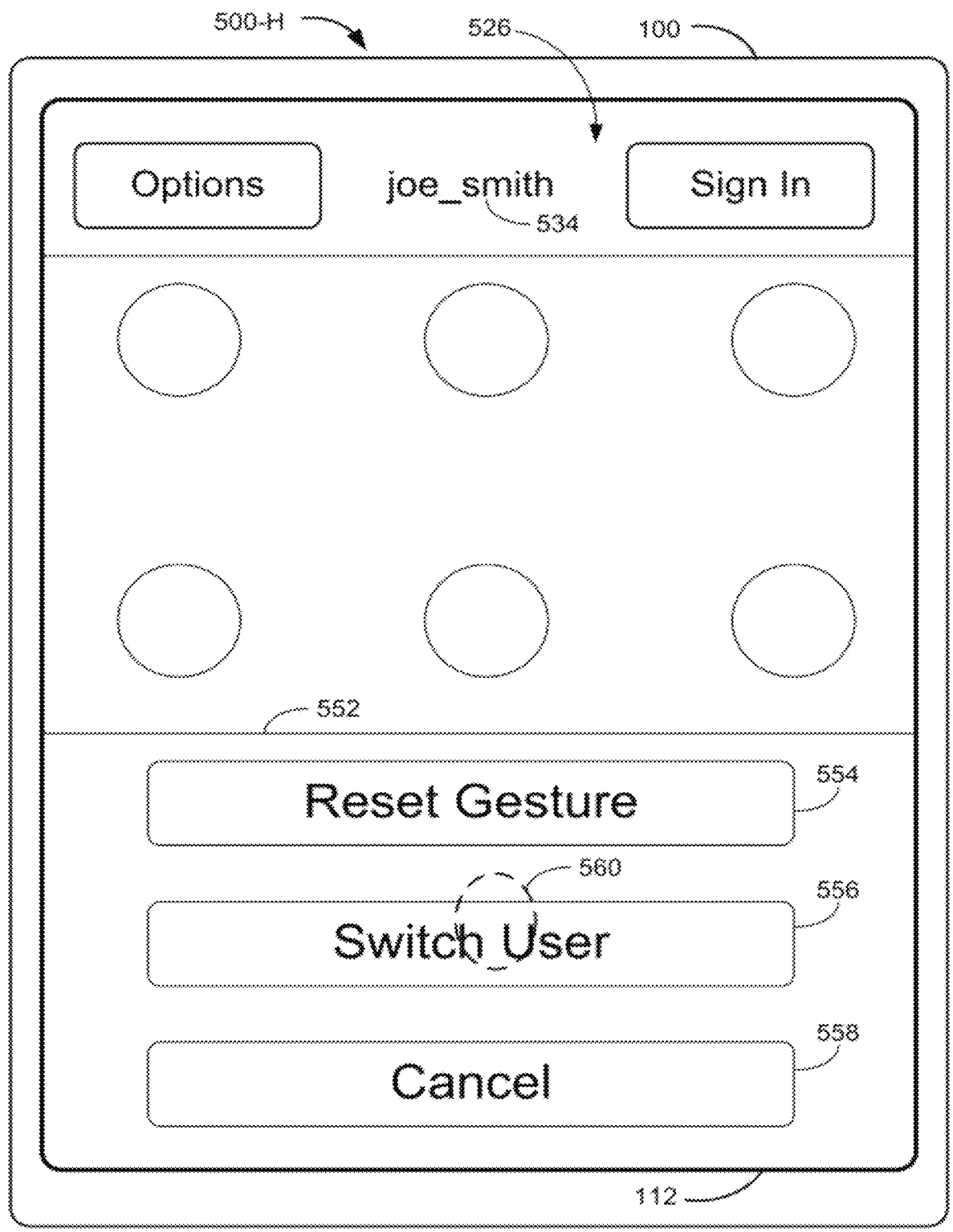
Figure 5I:
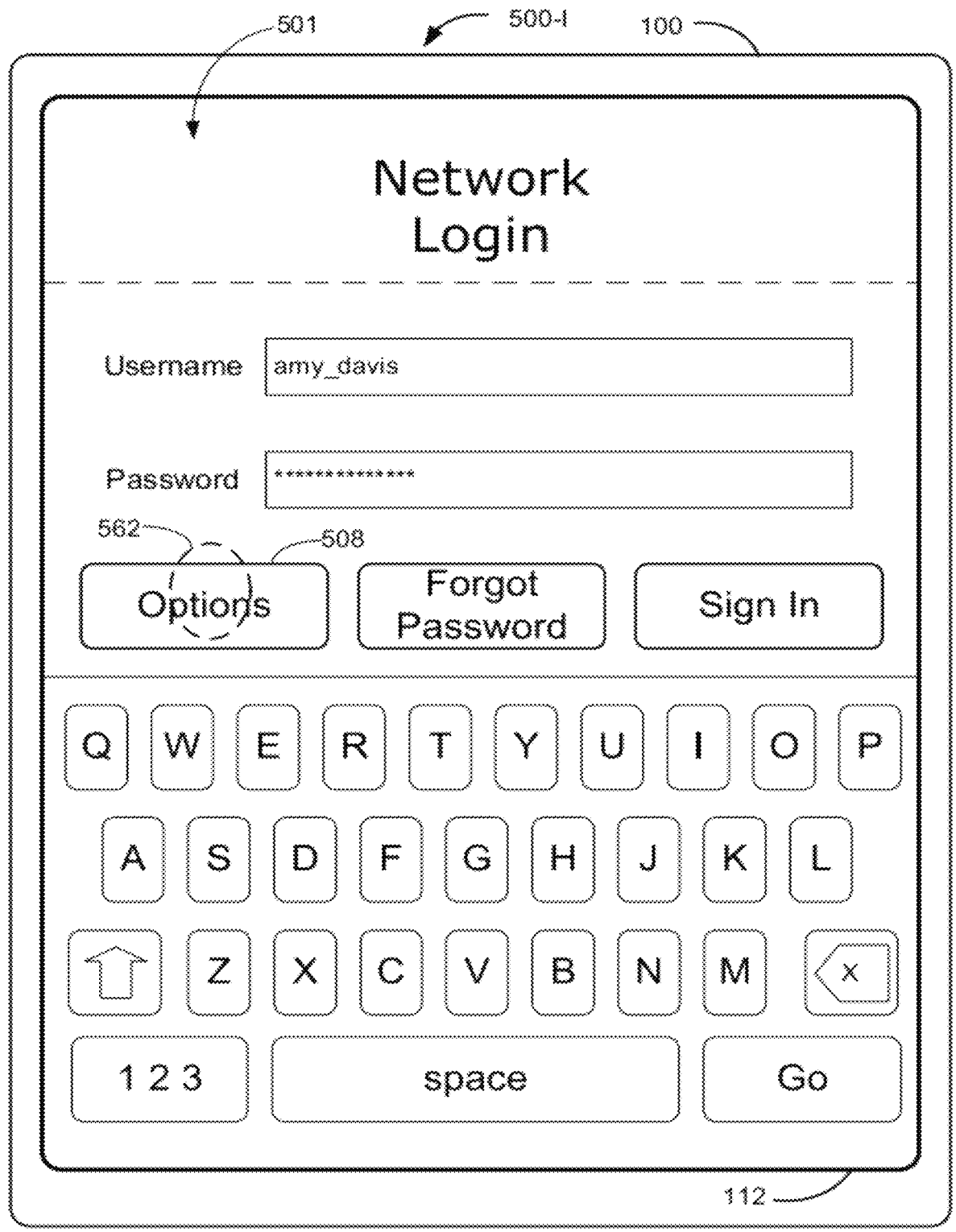
Figure 5J:
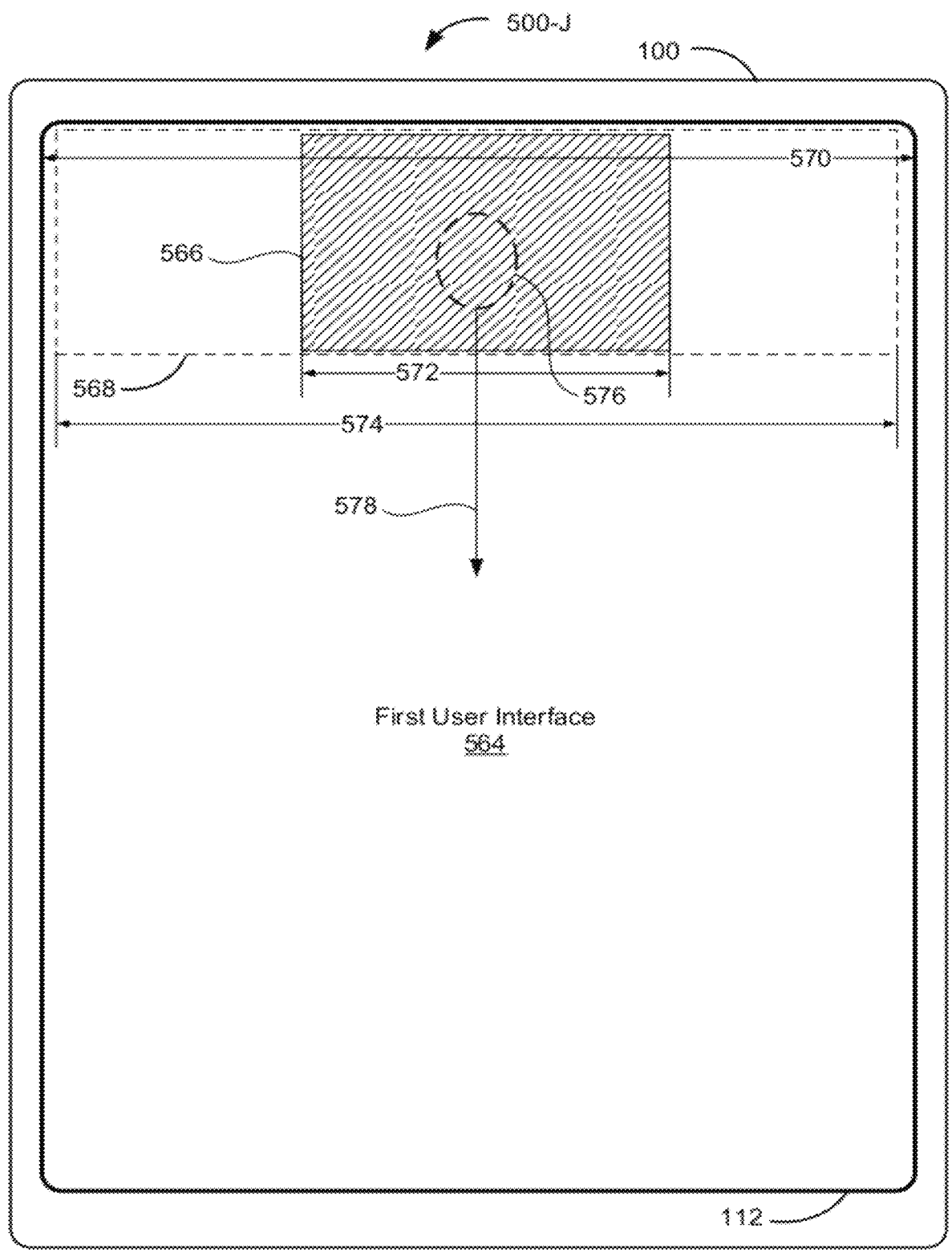
Figure 5K:
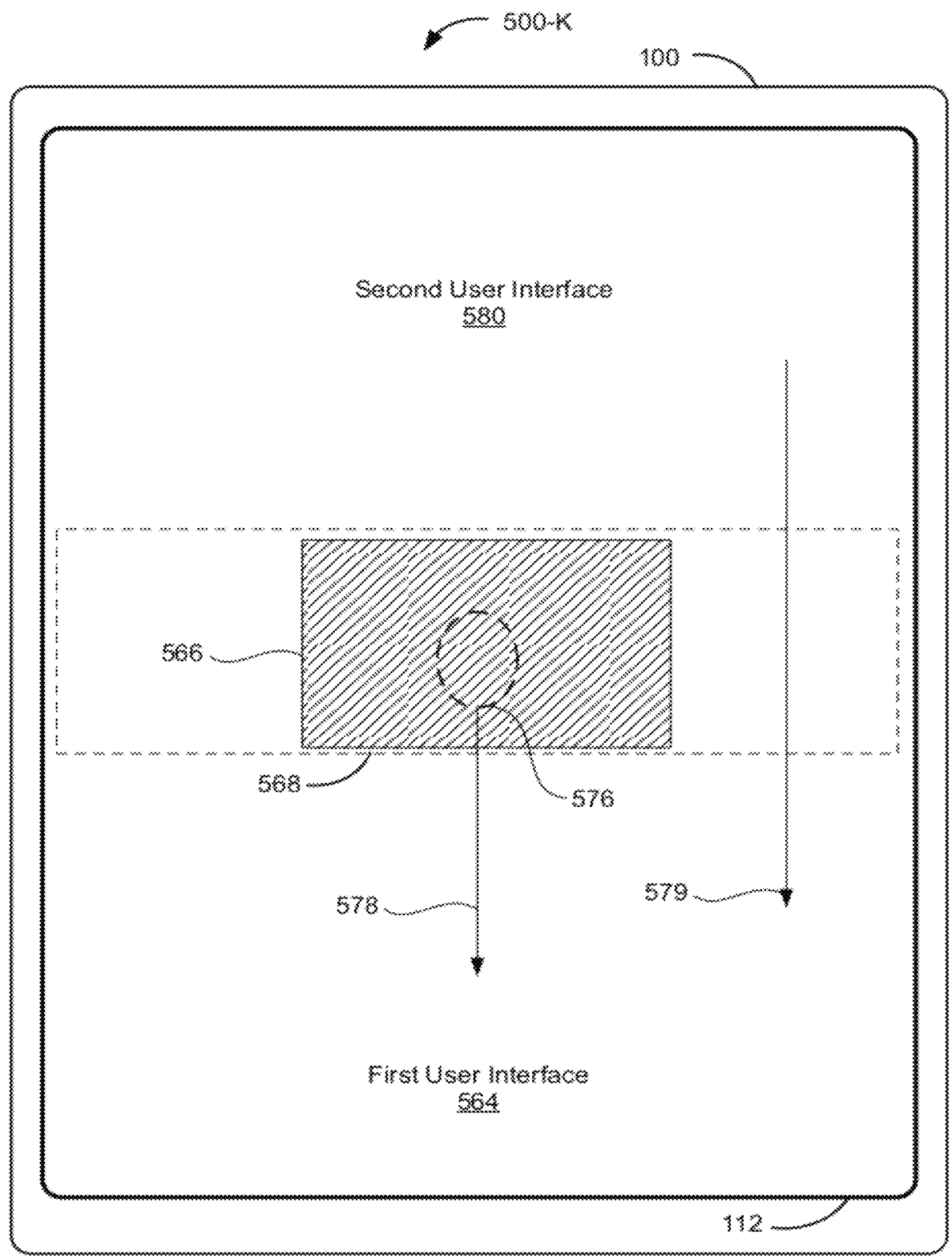
Figure 5L:
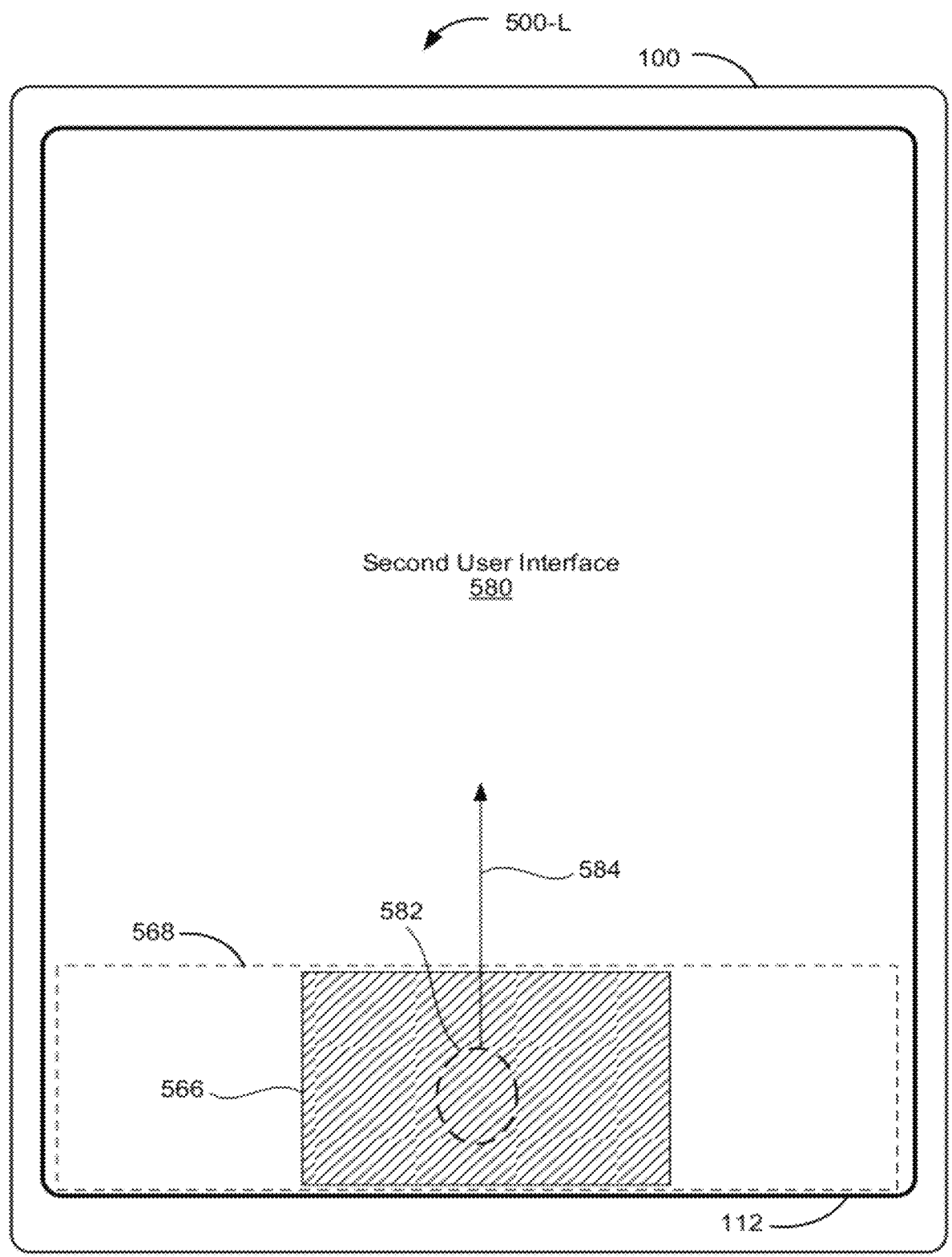
Figure 5M:
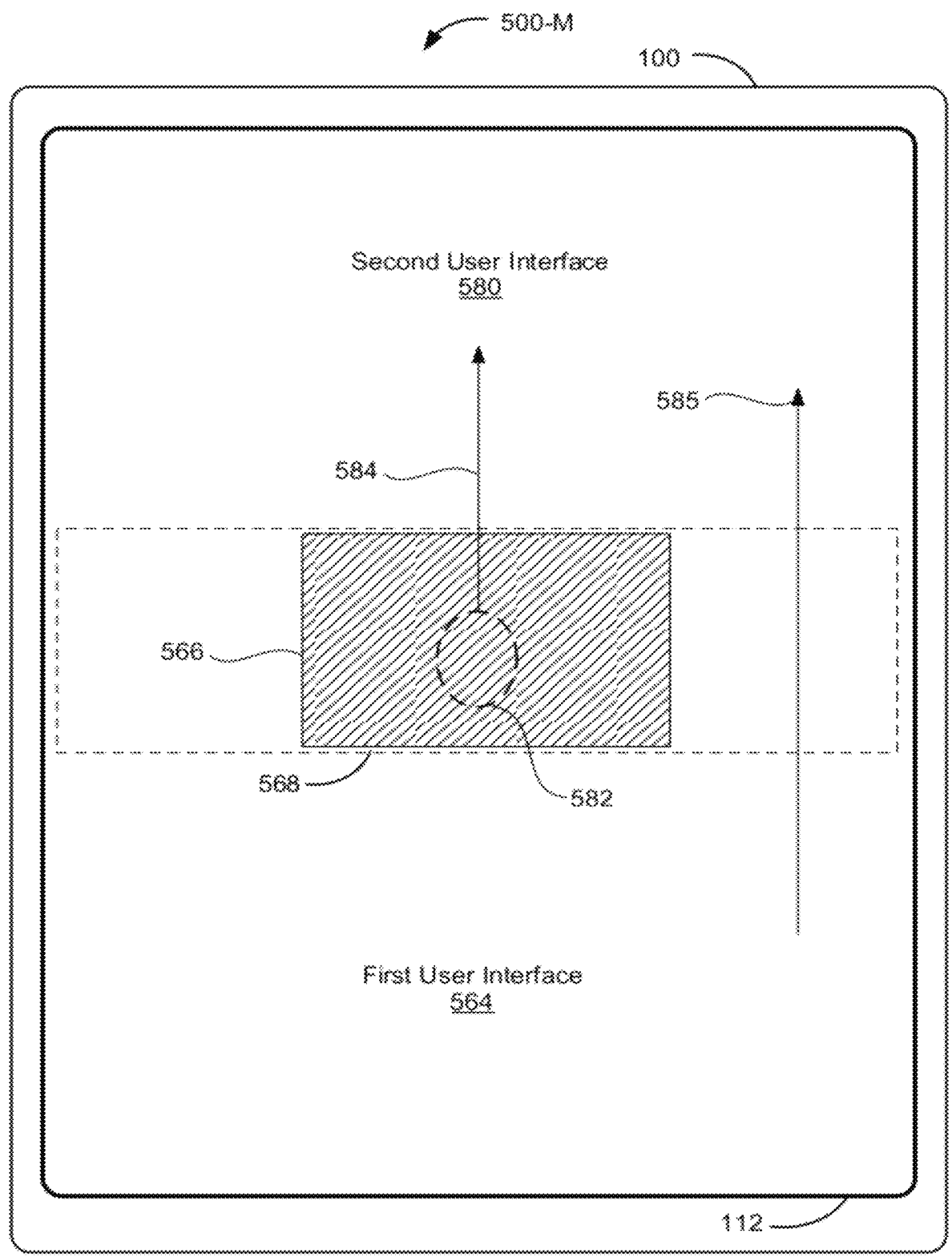
Figure 5N:
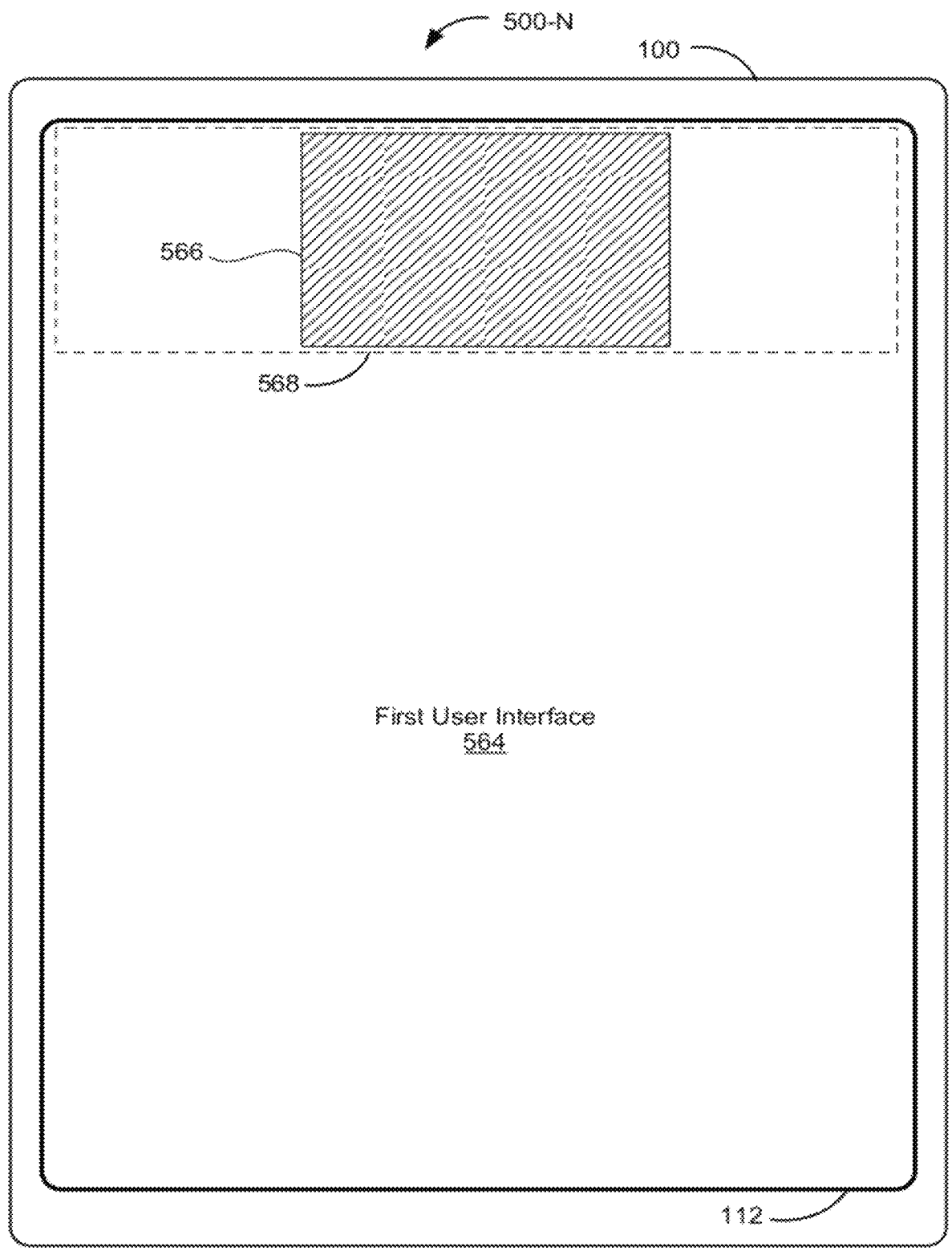
Figure 5O:
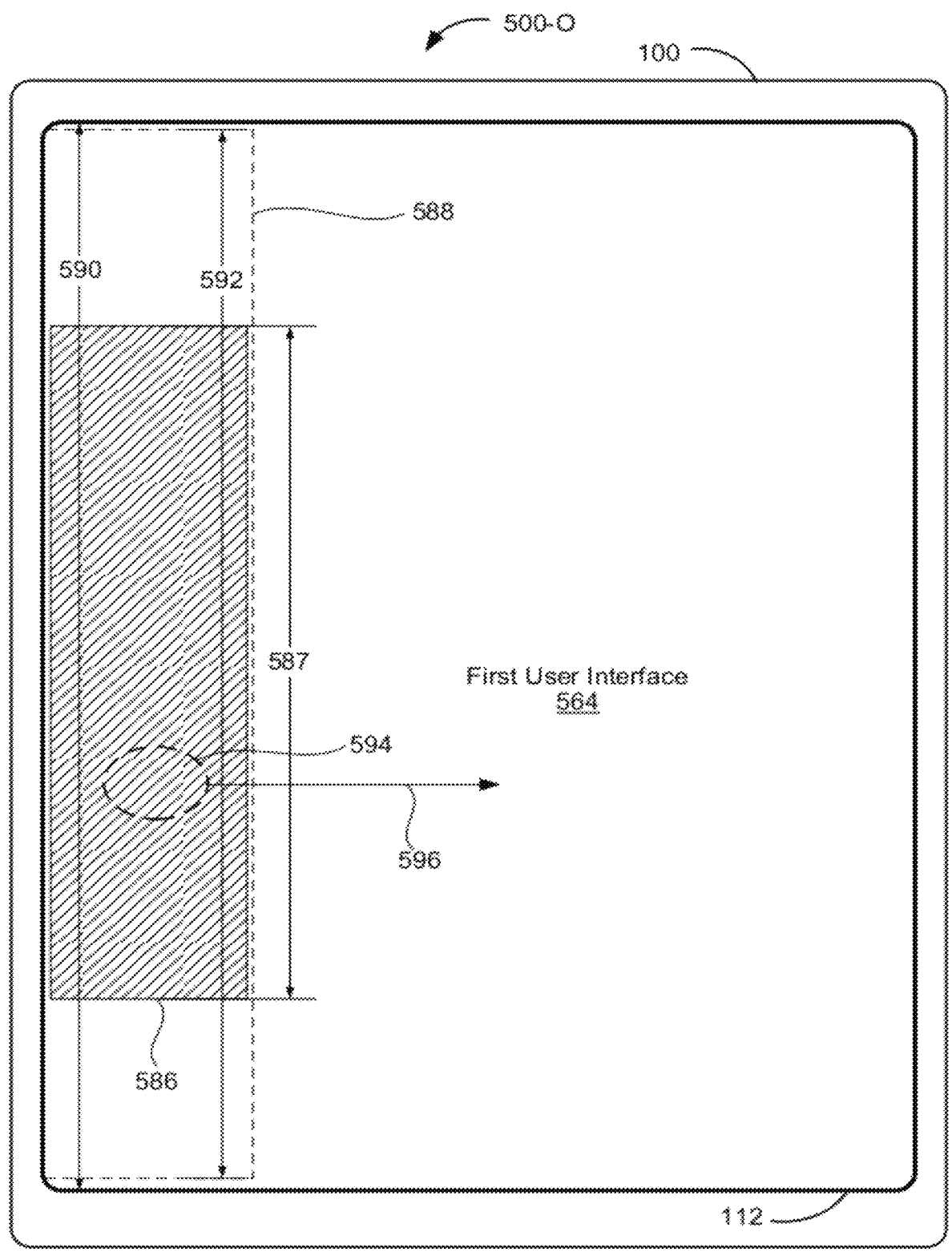
Figure 5P:
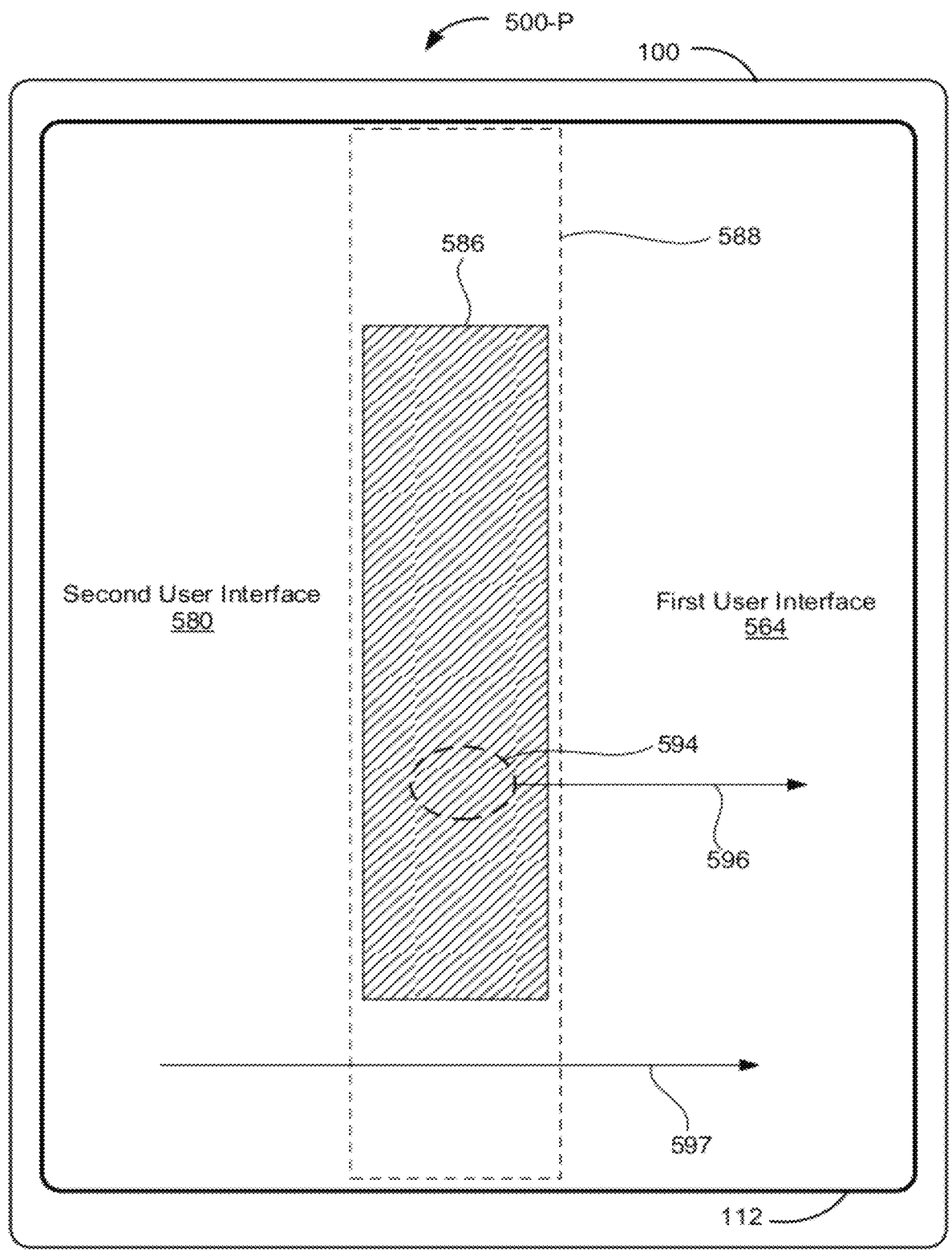
Figure 5Q:
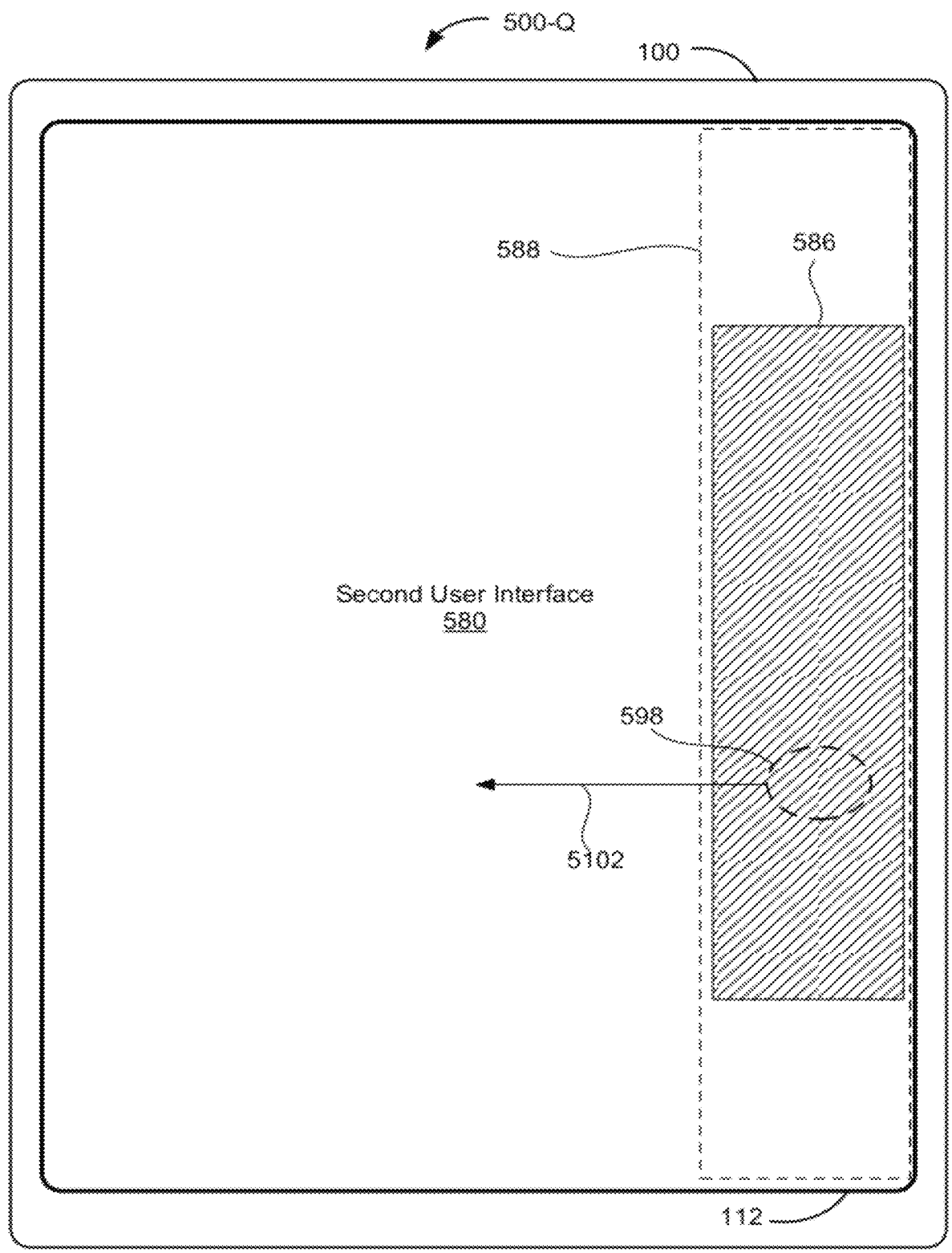
Figure 5R:
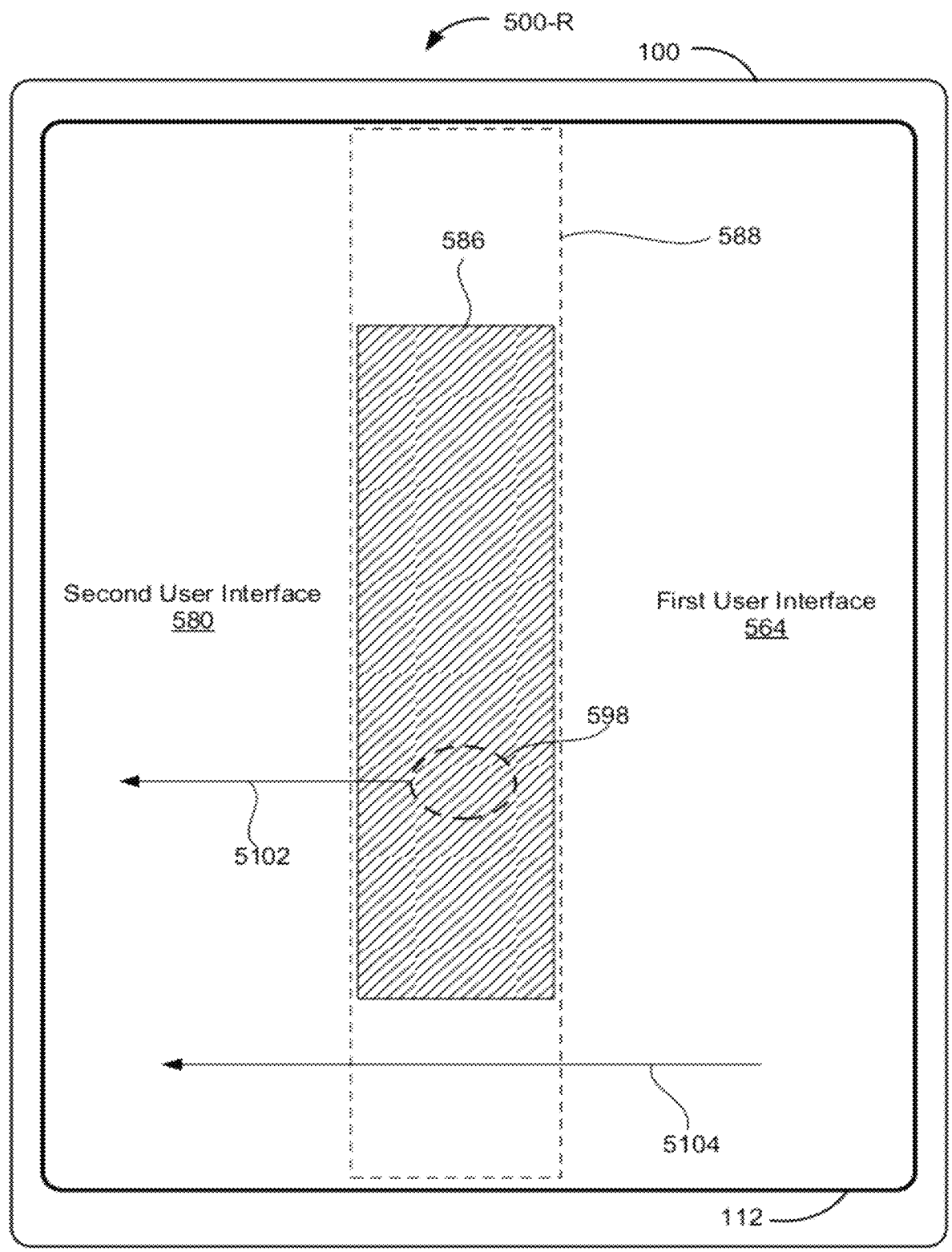
Figure 5S:
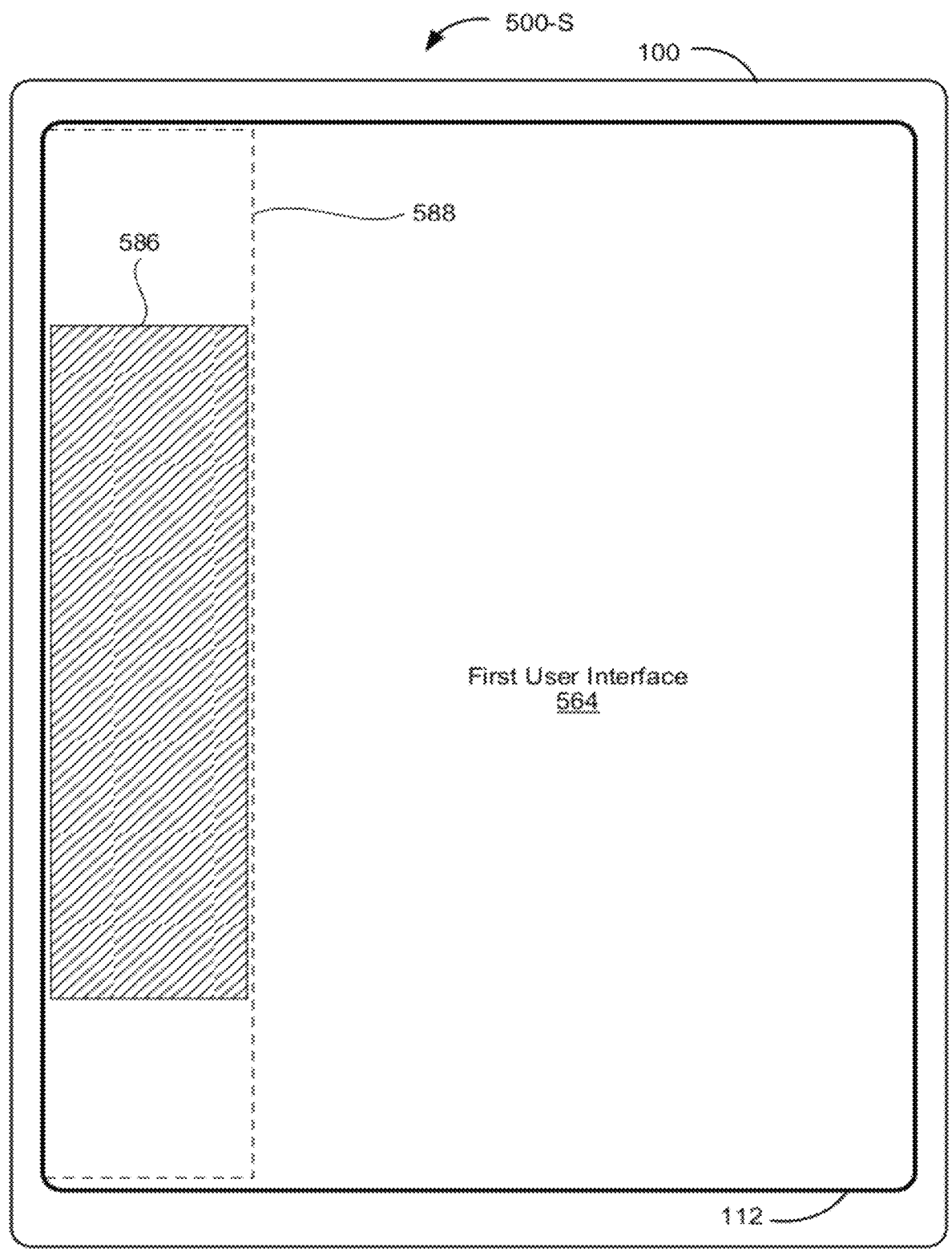

FIGS. 5A-5S illustrate exemplary user interfaces for switching between user interfaces, including switching between a text-based authentication user interface and a gesture-based authentication user interface, in accordance with some embodiments. The user interfaces in these figures are used to illustrate the processes described below, including the processes in FIGS. 6A-6C, and 7A-7B.

FIG. 5A illustrates user interface 500-A that includes text-based authentication user interface 501 (hereinafter "text-based interface" for convenience) displayed on a touch-sensitive display (e.g., touch screen 112) of a device (e.g., device 100). The text-based interface 501 is associated with a network, system, device, service, or store (e.g., an email, messaging, or other communication or collaboration service; a remote private network (e.g., a corporate internal network); a point-of-sale system, a digital content store; a digital application store; a mobile device, and so forth), and may be used to log into the network, system, device, service, or store (hereinafter collectively referred to as a "destination system" for convenience) as a user associated with a particular account or identity in the destination system. In some embodiments, the destination system to be logged into is the device on which text-based interface 501 is displayed (e.g., device 100).

Displayed within the text-based interface 501 are username field 502, password field 504, and soft keyboard 506. In some embodiments, options button 508, password recovery/reset (with button text "Forgot password") button 510, and sign-in button 512 are also displayed in text-based interface 501. In some embodiments, options button 508 and/or password recovery/reset button 510 may be omitted from display in text-based interface 501.

A user may use soft keyboard 506 to enter a username and an authentication code (also referred to as a password), each of which has at least one character, into username 502 and password 504 fields, respectively (e.g., by performing tap gestures on keys in soft keyboard 506 to activate the keys). For example, as shown in FIG. 5A, username "joe_smith" and a password, obscured by asterisks for security purposes, are entered into username 502 and password 504 fields, respectively. Gesture 514 (e.g., a tap gesture) is detected on sign-in button 512. In response to detection of gesture 514, sign-in button 512 is activated. In response to activation of sign-in button 512, device 100 submits the contents of username 502 and password 504 fields to the destination system for authentication. If the username and password combination is approved by the destination system, the user is logged into the destination system as the account or identity associated with the username/password combination. If either the username or password is incorrect, the user may be notified of the error and be prompted to re-enter and re-submit the username and password.

In some embodiments, if the user has forgotten his password, the user may activate a password recovery/reset button 510 using a gesture (e.g., a tap gesture similar to gesture 514) to initiate a password recovery or reset process.

In some embodiments, a user may activate options button 508 using a gesture (e.g., a tap gesture similar to gesture 514). In response to the activation of options button 508, additional options are displayed on displayed 112. Examples of such options are described further below.

In some embodiments, when a user successfully authenticates from device 100 using text-based authentication, device 100 retains (e.g., in authentication module 159) the username and optionally the password from the successful authentication. In a subsequent authentication attempt from the same device 100 without an intervening successful authentication by a different user, device 100 "reuses" the retained username and/or password and may populate the retained username/and or password in username 502 and password 504 fields, so that the same user may save time entering the username and/or password.

Also displayed in text-based interface 501 is graphical object 516. Graphical object 516 may include text, graphics, or a combination thereof. In some embodiments, graphical object 516 is a button, a slider control, a logo, or other icon. Graphical object 516 is displayed in graphical object area 518, which corresponds to an activation region for graphical object 516. The activation region for graphical object 516 is typically a hidden hit region that may extend beyond the displayed extent of graphical object 516 (as indicated by the dotted lines for area 518). In some embodiments, graphical object area 518 is located on one side of text-based interface 501 (e.g., a side adjacent to a side of display 112), as shown in FIG. 5A. In some embodiments, one or more hints 520 for the user are optionally displayed (e.g., in graphical object area 518).

FIG. 5B illustrates user interface 500-B, which includes text-based interface 501. A gesture (e.g., gesture 522) in direction 524 is detected that starts at a location of graphical object 516. In some embodiments, gesture 522 is initiated from a location within graphical object area 518, and not directly on graphical object 516. In some embodiments, gesture 522 is a swipe or drag gesture moving in direction 524. In some other embodiments, gesture 522 is a tap gesture. In some embodiments, hint 520 is directed to informing the user that a gesture, as in gesture 522, may be performed, initiating from a location of graphical object 516, as shown in FIG. 5B.

In response to the detection of gesture 522, text-based interface 501 moves out of view and gesture-based authentication user interface 526 (hereinafter "gesture-based interface" for convenience) moves into view, as shown in FIGS. 5C-5D. FIG. 5C includes user interface 500-C, in which text-based interface 501 moves, gradually out of view, in direction 525, and gesture-based interface 526 moving, gradually into view, in direction 525. In some embodiments, direction 525 matches direction 524 of gesture 522. Graphical object area 518, including graphical object 516, moves along between text-based interface 501 and gesture-based interface 526 in direction 525. In some embodiments, gesture 522 is a dragging gesture, and the movement of text-based interface 501, graphical object area 518, and gesture-based interface 526, moves along in accordance with the dragging movement of gesture 522; interfaces 501, 526 and graphical object area 518 move when gesture 522 moves and pauses when gesture 522 pauses. In some other embodiments, gesture 522 is a swipe gesture, and text-based interface 501, graphical object area 518, and gesture-based interface 526 move without synchronization with gesture 522; once gesture 522 is detected, interfaces 501, 526 and graphical object area 518 move without regard to whether gesture 522 pauses. In some embodiments, the movement of text-based interface 501, graphical object area 518, and gesture-based interface 526 is displayed as an animation showing the transition from text-based interface 501 to gesture-based interface 526.

FIG. 5D includes user interface 500-D, which includes gesture-based interface 526 after the completion of the movement shown in FIG. 5C. Gesture-based interface 526 includes a plurality of authentication gesture objects 528, options button 530, sign-in button 532. In some embodiments, a username 534 retained from the most recent successful authentication is displayed. When username 534 is displayed, the user making the authentication attempt is attempting to authenticate as the account or identity associated with the displayed username 534.

In some embodiments, text-based interface 501 and gesture-based interface 526 are part of the same authentication application; text-based interface 501 is one page in the application and gesture-based interface 526 is another page in the application.

Also displayed in gesture-based interface 526 is graphical object area 518, including graphical object 516. In some embodiments, in gesture-based interface 526, graphical object area 518 and graphical object 516 are on the opposite side to where graphical object area 518 and graphical object 516 are displayed in text-based interface 501. In some embodiments, hint 536, which is similar to hint 520, is displayed (e.g., in graphical object area 518).

In FIG. 5D, a gesture (e.g., gesture 538) in direction 540 is detected that starts from a location of graphical object 516. In some embodiments, gesture 538 is initiated from a location within graphical object area 518, and not directly on graphical object 516. In some embodiments, gesture 538 is a swipe or drag gesture moving in direction 540. In some other embodiments, gesture 538 is a tap gesture. In some embodiments, hint 536 is directed to informing the user that a gesture, such as gesture 538, may be performed, starting from a location of graphical object 516, as shown in FIG. 5D. In some embodiments, direction 540 is the reverse of direction 524 of gesture 522; gesture 538 is the reverse of gesture 522.

In response to the detection of gesture 538, gesture-based interface 526 moves out of view and text-based interface 501 moves back into view, as shown in FIGS. 5E-5F. FIG.

5E includes user interface 500-E, in which text-based interface 501 moves, gradually into view, in direction 542, and gesture-based interface 526 moves, gradually out of view, in direction 542. Direction 542 is the same as direction 540 of gesture 538. The movement shown in FIG. 5E is the reverse of the movement shown in FIG. 5C, and the details regarding the movement shown in FIG. 5C, as described above, apply analogously to the movement shown in FIG. 5E. When the movement is completed, user interface 500-F, including text-based interface 501, is displayed on display 112, as shown in FIG. 5F.

FIG. 5G illustrates user interface 500-G, which includes gesture-based interface 526. As described above, gesture-based interface 526 includes a plurality of authentication gesture objects 528 (hereinafter "gesture objects" for convenience). Authentication gesture 544, which includes strokes 546-1 thru 546-5, is detected on display 112. Authentication gesture 544 is input by the user in lieu of a password entered using soft keyboard 506; authentication gesture 544 is a gesture-based authentication code, where the pattern of strokes 546 is the code. In some embodiments, an authentication gesture, such as authentication gesture 544, begins with a finger contact on one of gesture objects 528 (e.g., in FIG. 5G, authentication gesture 544 begins on gesture object 528-1). The finger contact, staying on display 112, moves in strokes from one gesture object 528 to another. The authentication gesture ends when the finger contact is lifted from display 112 (e.g., at one of gesture objects 528). Thus, in FIG. 5G, authentication gesture 544 starts from gesture object 528-1 with stroke 546-1, includes strokes 546-2 thru 546-5, and pauses at gesture object 528-3. If the finger contact corresponding to authentication gesture 544 lifts off from display 112 at this point, authentication gesture 544 is completed.

In some embodiments, respective strokes 546 in authentication gesture 544 are displayed differently based on the order of the strokes 546. For example, earlier strokes 546 within authentication gesture 544 are displayed with a lighter color or shade or more transparency or less thickness, and later strokes within authentication gesture 544 are displayed with a darker color or shade or more opaqueness or more thickness.

In some embodiments, the user can perform a gesture in an empty space in gesture-based interface 526 or on username 534 (e.g., a tap gesture in an empty space, or a double-tap gesture on username 534) to clear authentication gesture 544 and start over.

In some embodiments, when authentication gesture 544 is completed, authentication gesture 544 and username 534 are automatically submitted to the destination system for authentication. In some other embodiments, when authentication gesture 544 is completed, the user then activates sign-in button 532 (e.g., by performing tap gesture 548 on sign-in button 532) to submit username 534 and authentication gesture 544 to the destination system for authentication. If the destination approves the combination of username 534 and authentication gesture 544, the user is logged in as the account/identity identified by username 534. If authentication gesture 544 is incorrect, the user may be prompted to re-input a correct authentication gesture.

In gesture-based interface 526, gesture 550 (e.g., a tap gesture) may be detected on options button 530. In response to detection of gesture 550, options button 530 is activated, which activates display of menu 552 on display 112, as shown in FIG. 5H. FIG. 5H includes user interface 500-H, which includes gesture-based interface 526 and menu 552 partially over gesture-based interface 526. Username 534 may also be displayed. Menu 552 includes reset gesture button 554, switch user button 556, and cancel button 558. One of buttons 554, 556, and 558 may be activated by performing a gesture (e.g., a tap gesture) on the respective button. Activation of cancel button 558 cancels menu 552, removing menu 552 from display. Activation of reset gesture button 554 activates a process for resetting an authentication gesture associated with an account or identity at the destination system (e.g., the account associated with displayed username 534).

Gesture 560 (e.g., a tap gesture) is detected on switch user button 556. In response to detection of gesture 560 on switch user button 556, the username and password retained from the last successful authentication from device 100 is cleared. For example, username 534 is not displayed in gesture-based interface 526. In some embodiments, the next authentication attempt from device 100 to the destination system must be performed using text-based interface 501 (i.e., the next authentication attempt must be done using text-based authentication).

In some embodiments, retained username information (e.g., username 534) is cleared automatically after elapse of a predefined time period (e.g., 1, 2, 4, 8, 24 hours) since the last login using the retained username (without an intervening log-in using another username).

FIG. 5I includes user interface 500-I, which includes text-based interface 501. Gesture 562 is detected on options button 508. In response to detection of gesture 562 on options button 508, a menu (not shown) similar to menu 552 (FIG. 5H) may be displayed. The menu may include switch user button 556 and cancel button 558, as well as other buttons, such as a button to create an authentication gesture. When the button to create an authentication gesture is activated, the user is prompted through a process to create an authentication gesture for the user's account at the destination system. A version of gesture-based interface 526 is displayed to the user, where the user will perform the desired authentication gesture and submit it to the destination system.

FIG. 5J illustrates user interface 500-J that includes first user interface 564 displayed on a touch-sensitive display (e.g., touch screen 112) of a device (e.g., device 100). First user interface 564 may include any number of user interface objects (e.g., text fields, buttons, slider controls, graphics, text, etc.). In some embodiments, first user interface 564 is a text-based authentication user interface (e.g., text-based interface 501). First user interface 564 includes graphical object 566. Graphical object 566 may include text, graphics, or a combination thereof. In some embodiments, graphical object 566 is a button, a slider control, a logo, or other icon. Graphical object 566 is analogous to graphical object 516, described above with reference to FIG. 5A. Graphical object 566 has length 572.

Graphical object 566 is displayed near or adjacent to one side of display 112. In some embodiments, graphical object 566 is displayed near or adjacent to the top side of display 112, as shown in FIG. 5J. In some embodiments, graphical object 566 is displayed near or adjacent to the bottom side of display 112.

Graphical object 566 has a corresponding activation region. The activation region is where a gesture must begin in order to activate or affect graphical object 566. In some embodiments, the activation region of graphical object 566 is the graphical object itself or the area of a bounding box around graphical object 566, with length 572. In some other embodiments, graphical object 566 has activation region 568 with length 574 that is equal to or greater than length 572. In some embodiments, length 574 is the same length as the length 570 of the side of display 112 near which graphical object 566 is displayed. It should be noted that in FIG. 5J, length 574 is shown as slightly shorter than length 570 in order to show the contours of activation region 568. In some embodiments, length 572 is the same as length 570; graphical object 566 spans length 570.

Gesture 576 is detected on graphical object 566 (or on activation region 568). In some embodiments, gesture 576 is a swipe or drag gesture moving in direction 578. In some other embodiments, gesture 576 is a tap gesture.

In response to detection of gesture 576 on graphical object 566 or activation region 568, first user interface 564 is replaced on display 112 by second user interface 580 (FIG. 5L). In some embodiments, an animation showing the transition from first user interface 564 to second user interface 580 is displayed. FIG. 5K illustrates an instant in the animation showing the transition from first user interface 564 to second user interface 580. FIG. 5K includes user interface 500-K, which includes first user interface 564 moving out of view in direction 579 and second user interface 580 moving into view in direction 579. Graphical object 566 and the corresponding activation region 568 move along in direction 579 as well, from the top side of display 112 toward the bottom side of display 112. In some embodiments, direction 579 matches direction 578 of gesture 576.

FIG. 5L includes user interface 500-L, which shows a second user interface 580 displayed on display 112 (e.g., after the completion of the transition animation illustrated in FIG. 5K). In some embodiments, second user interface 580 is a gesture-based authentication user interface (e.g., gesture-based interface 526). Graphical object 566 is displayed near or adjacent to the bottom side of display 112, and the corresponding activation region 568 has relocated to the bottom side of display 112 along with graphical object 566.

In FIG. 5L, gesture 582 is detected on graphical object 566 (or on activation region 568). In some embodiments, gesture 582 is a swipe or drag gesture moving in direction 584. In some embodiments, direction 584 is the reverse of direction 578 of gesture 576; gesture 582 is the reverse of gesture 576. In some other embodiments, gesture 582 is a tap gesture.

In response to detection of gesture 582 on graphical object 566 or activation region 568, second user interface 580 is replaced on display 112 by first user interface 564 (FIG. 5N). In some embodiments, an animation showing the transition from second user interface 580 to first user interface 564 is displayed. FIG. 5M illustrates an instant in the animation showing the transition from second user interface 580 to first user interface 564. FIG. 5M includes user interface 500-M, which includes first user interface 564 moving into view in direction 585 and second user interface 580 moving out of view in direction 585. Graphical object 566 and the corresponding activation region 568 move along in direction 585 as well, from the bottom side of display 112 toward the top side of display 112. In some embodiments, direction 585 matches direction 584 of gesture 582.

FIG. 5N includes user interface 500-N, which shows first user interface 564 redisplayed on display 112 (e.g., after the completion of the transition animation illustrated in FIG. 5M). Graphical object 566 is displayed near or adjacent to the top side of display 112, and the corresponding activation region 568 has relocated to the top side of display 112 along with graphical object 566.

FIG. 5O illustrates user interface 500-O that includes first user interface 564, with graphical object 586 displayed near or adjacent to the left side of display 112, as opposed to graphical object 566 displayed near or adjacent to the top side of display 112. Graphical object 586 may include text, graphics, or a combination thereof. In some embodiments, graphical object 586 is a button, a slider control, a logo, or other icon. Graphical object 586 is analogous to graphical object 516, described above with reference to FIG. 5A. Graphical object 586 has length 587.

In some embodiments, graphical object 586 is displayed near or adjacent to the left side of display 112, as shown in FIG. 5O. In some embodiments, graphical object 586 is displayed near or adjacent to the right side of display 112.

Graphical object 586 has a corresponding activation region. The activation region is where a gesture must begin in order to activate or affect graphical object 586. In some embodiments, the activation region of graphical object 586 is the graphical object itself or the area of a bounding box around graphical object 586, with length 587. In some other embodiments, graphical object 586 has activation region 588 with length 592 that is equal to or greater than length 587. In some embodiments, length 592 is the same length as the length 590 of the side of display 112 near which graphical object 586 is displayed. It should be noted that in FIG. 5O, length 592 is shown as slightly shorter than length 590 in order to show the contours of activation region 588. In some embodiments, length 587 is the same as length 590; graphical object 586 spans length 590.

Gesture 594 is detected on graphical object 586 (or on activation region 588). In some embodiments, gesture 594 is a swipe or drag gesture moving in direction 596. In some other embodiments, gesture 594 is a tap gesture.

In response to detection of gesture 594 on graphical object 586 or activation region 588, first user interface 564 is replaced on display 112 by second user interface 580 (FIG. 5Q). In some embodiments, an animation showing the transition from first user interface 564 to second user interface 580 is displayed. FIG. 5P illustrates an instant in the animation showing the transition from first user interface 564 to second user interface 580. FIG. 5P includes user interface 500-P, which includes first user interface 564 moving out of view in direction 597 and second user interface 580 moving into view in direction 597. Graphical object 586 and the corresponding activation region 588 move along in direction 597 as well, from the left side of display 112 toward the right side of display 112. In some embodiments, direction 597 matches direction 596 of gesture 594.

FIG. 5Q includes user interface 500-Q, which shows second user interface 580 displayed on display 112 (e.g., after the completion of the transition animation illustrated in FIG. 5P). Graphical object 586 is displayed near or adjacent to the right side of display 112, and the corresponding activation region 588 has relocated to the right side of display 112 along with graphical object 586.

In FIG. 5Q, gesture 598 is detected on graphical object 586 (or activation region 588). In some embodiments, gesture 598 is a swipe or drag gesture moving in direction 5102. In some embodiments, direction 5102 is the reverse of direction 596 of gesture 594; gesture 594 is the reverse of gesture 598. In some other embodiments, gesture 598 is a tap gesture.

In response to detection of gesture 598 on graphical object 586 or activation region 588, second user interface 580 is replaced on display 112 by first user interface 564 (FIG. 5S). In some embodiments, an animation showing the transition from second user interface 580 to first user interface 564 is displayed. FIG. 5R illustrates an instant in the animation showing the transition from second user interface 580 to first user interface 564. FIG. 5R includes user interface 500-R, which includes first user interface 564 moving into view in direction 5104 and second user interface 580 moving out of view in direction 5104. Graphical object 586 and the corresponding activation region 588 move along in direction 5104 as well, from the right side of display 112 toward the left side of display 112. In some embodiments, direction 5104 matches direction 5102 of gesture 598.

FIG. 5S includes user interface 500-S, which shows first user interface 564 displayed on display 112 (e.g., after the completion of the transition animation illustrated in FIG. 5S). Graphical object 586 is displayed near or adjacent to the left side of display 112, and the corresponding activation region 588 has relocated to the left side of display 112 along with graphical object 586.

FIGS. 6A-6C are flow diagrams illustrating a method 600 of switching between a text-based authentication user interface and a gesture-based authentication user interface in accordance with some embodiments. The method 600 is performed at an electronic device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 600 may be combined and/or the order of some operations may be changed.

As described below, the method 600 provides an intuitive way to switch between a text-based authentication user interface and a gesture-based authentication user interface. The method reduces the cognitive burden on a user when switching between a text-based authentication user interface and a gesture-based authentication user interface, thereby creating a more efficient human-machine interface. For battery-operated electronic devices, enabling a user to switch between a text-based authentication user interface and a gesture-based authentication user interface faster and more efficiently conserves power and increases the time between battery charges.

The device displays a first authentication user interface on a display, the first authentication user interface including a text entry field for entering a text-based authentication code (602). For example, in FIG. 5A, text-based interface 501, which includes password field 504 for entering a text-based authentication code or password, is displayed on display 112. The first authentication user interface also typically includes another text entry field for entering a username (e.g. username field 502, FIG. 5A). In some embodiments, the first authentication user interface includes a soft keyboard (e.g., soft keyboard 506, FIG. 5A) for entering text in the text entry field(s).

The device detects a first input by a user on the touch-sensitive surface while displaying the first authentication user interface (604). For example, in FIG. 5B, gesture 522 by a user is detected on touch-sensitive display 112 while text-based interface 501 is displayed.

In some embodiments, the first input is a swipe gesture (606). Gesture 522, for example, may be a swipe gesture with direction 524. In some embodiments, the swipe gesture is vertical (i.e., up or down). In some embodiments, the swipe gesture is horizontal (i.e., left or right, not shown).

In some embodiments, the first input is a drag gesture (608). Gesture 522, for example, may be a drag gesture with direction 524. In some embodiments, the drag gesture is vertical (i.e., up or down). In some embodiments, the drag gesture is horizontal (i.e., left or right, not shown). In some embodiments, the first input is a drag gesture that starts on a particular graphical object (e.g., a logo, a slider control, a button, or other icon). Gesture 522, for example, starts on graphical object 516.

In some embodiments, the first input is a tap gesture (610). In some embodiments, the first input is a tap gesture on a particular graphical object (e.g., a logo, a slider control, a button, or other icon). For example, gesture 522 may be a tap gesture on graphical object 516.

In response to detecting the first input, the device displays a second authentication user interface on the display, distinct from the first authentication user interface, where the second authentication user interface is configured for entering a gesture-based authentication code (612). For example, in FIGS. 5B-5D, in response to detection of gesture 522, gesture-based interface 526, which is distinct from text-based interface 501, is displayed. Gesture-based interface 526 is configured for entering a gesture-based authentication code using gesture objects 528.

In some embodiments, when gesture-based interface 526 is displayed to a user who does not have a gesture-based authentication code associated with his account, introductory messages and/or instructions regarding creating the gesture-based authentication code are displayed.

Switching from displaying a text-based authentication user interface to a gesture-based authentication user interface is advantageous in that the gesture-based authentication user interface may provide a quicker way for a user to authenticate himself. Quicker authentication is useful in situations where the user is already associated with the device (e.g., through a prior authentication using a text-based authentication code) and has to login and logout through the same device repeatedly (e.g., logging into and out of a point-of-sale system through a mobile device).

In some embodiments, displaying the second authentication user interface in response to detecting the first input includes replacing display of the first authentication user interface with display of the second authentication user interface (614). For example, in response to gesture 522, text-based interface 501 is replaced on display 112 with gesture-based interface 526, as shown in FIGS. 5C-5D. In some embodiments, displaying the second authentication user interface in response to detecting the first input includes displaying an animation of the second authentication user interface replacing the first authentication user interface (616). For example, FIG. 5C shows an instant in an animation transitioning from text-based interface 501 to gesture-based interface 526.

In some embodiments, the first input is initiated at a location on the touch-sensitive surface that corresponds to a location of a graphical object on the display, the graphical object being displayed in both the first authentication user interface and the second authentication user interface (618). For example, in some embodiments, if the first input is a drag gesture, the drag gesture must start on a particular graphical object (such as graphical object 516 (FIG. 5B), a logo, a slider control, a button, or other icon). Otherwise, the drag gesture will not result in display of the gesture-based authentication user interface. In addition, the particular graphical object is also displayed in the gesture-based authentication user interface (e.g., gesture-based interface 526, FIG. 5D). For example, in FIG. 5B, gesture 522 is initiated on graphical object 516. Graphical object 516 is displayed in both text-based interface 501 and gesture-based interface 526.

In some embodiments, the graphical object moves from a first location on the display in the first authentication user interface to a second location on the display in the second authentication user interface, distinct from the first location on the display (620). For example, graphical object 516 moves from the top of the display in the first authentication user interface (FIG. 5B) to the bottom of the display in the second authentication user interface (FIG. 5D). Alternatively, the object may move between the left side of the display and the right side of the display (not shown). In some embodiments, the object moves from a first side of the display to a second side of the display, opposite the first side. This movement and continuous display of the graphical object in both the first and second user interfaces helps to remind a user how to go back and forth (toggle) between the two interfaces.

In some embodiments, the device, while displaying the second authentication user interface, detects a second input that is initiated at a location on the touch-sensitive surface that corresponds to a location of the graphical object on the display (622). In response to detecting the second input, the device replaces display of the second authentication user interface with display of the first authentication user interface (e.g., via an animated transition) (624). For example, while gesture-based interface 526 is displayed, gesture 538 is detected on graphical object 516 (FIG. 5D). In response to detection of gesture 528, gesture-based interface 516 is replaced on the display with text-base interface 501 through an animated transition (FIGS. 5D-5F).

In some embodiments, the first input is a swipe gesture in a first direction and the second input is a swipe gesture in a direction opposite to the first direction (626). For example, gesture 522 may be a swipe gesture in direction 524, and gesture 538 may be a swipe gesture in direction 540.

In some embodiments, the first input is a drag gesture in a first direction and the second input is a drag gesture in a direction opposite to the first direction (628). For example, gesture 522 may be a drag gesture in direction 524, and gesture 538 may be a drag gesture in direction 540.

While displaying the second authentication user interface, the device detects one or more gestures by the user at locations on the touch-sensitive surface that correspond to locations on the second authentication user interface (630). In some embodiments, the authentication gesture is a single, continuous gesture on the touch-sensitive surface. In some embodiments, the one or more gestures are a series of gestures (e.g., strokes) on the touch-sensitive surface. For example, in FIG. 5G, authentication gesture 544 is detected. Authentication gesture 544 includes one or more strokes 546 that intersect with one or more gesture objects 528 in gesture-based interface 526.

The device authenticates the user in accordance with a determination that the detected one or more gestures correspond to a gesture-based authentication code for the user (632). In some embodiments, authentication of a username/gesture combination is performed as soon as the gesture is completed (e.g., for a single continuous gesture, when the finger lifts off the touch-sensitive surface). In some embodiments, authentication of a username/gesture combination is performed when the user activates a sign-on button or other similar control after the gesture (or gestures) is completed. For example, in FIG. 5G, gesture 548 is detected on sign-in button 532, which activates sign-in button 532. In response to activation of sign-in button 532, authentication gesture 544 and username 534 is submitted to the destination system for authentication. The user is authenticated if the destination system determines that the authentication gesture 544 is correct for username 534.

In some embodiments, use of gesture-based authentication at the electronic device requires a prior authentication of the user at the electronic device via text-based authentication (634). In some embodiments, a respective user must authenticate on the device with a text password first before the gesture password feature is enabled at the device for the respective user. For example, after activation of switch user button 560, the device is no longer associated with a specific user name. The next authentication attempt from the device must be done using text-based authentication (e.g., via text-based interface 501).

In some embodiments, use of gesture-based authentication requires a prior authentication of the user at the electronic device via text-based authentication without any intervening authentication at the electronic device by another user (636). For example, device 100 in FIGS. 5D-5F is associated with the username "joe_smith." If a different user logs in as a different user in text-based interface 501, username "joe_smith" is not associated with the device anymore and gesture-based authentication for user "joe_smith" is not available until he logs in again using text-based interface 501.

In some embodiments, use of gesture-based authentication requires a prior authentication of the user at the electronic device via text-based authentication within a predefined time period (e.g., 1, 4, 8, or 24 hours) (638). For example, retained username information for associating device 100 with a user after the user logged in using text-based interface 501 may be cleared automatically after a predefined time period since the last login by the user. Thus, if the user wishes to log in using gesture-based interface 526, the user must log in before the time period elapses and the username is cleared. As another example, the username is retained, but the user still has to authenticate via text-based authentication after a predefined time period has elapsed since the user's last gesture-based or text-based authentication. As another example, the username is retained, but the user still has to authenticate via text-based authentication after a predefined time period has elapsed since the user's last text-based authentication.

In some embodiments, authenticating the user provides access to one of: a remote computer system, a digital content store, or a digital application store (640). The destination system to which the user logs in may be a remote system, remote network, a digital content store (e.g., a digital music store, a digital video store), or a digital application store (e.g., a mobile phone app store).

FIGS. 7A-7B are flow diagrams illustrating a method 700 of switching between a first user interface and a second user interface, in accordance with some embodiments. The method 700 is performed at an electronic device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 700 may be combined and/or the order of some operations may be changed.

As described below, the method 700 provides an intuitive way to switch between a first user interface and a second user interface. The method reduces the cognitive burden on a user when switching between a first user interface and a second user interface, thereby creating a more efficient human-machine interface. For battery-operated electronic devices, enabling a user to switch between a first user interface and a second user interface faster and more efficiently conserves power and increases the time between battery charges.

The device displays a first user interface on a display, the first user interface including a graphical object at a first location on the display (702). For example, in FIG. 5J, first user interface 564 is displayed on display 112. Graphical object 566 is displayed at a first location on display 112 (e.g., at the top side of display 112).

While displaying the first user interface, the device detects a first gesture by a user on the touch-sensitive surface, the first gesture starting at a location on the touch-sensitive surface that corresponds to the first location of the graphical object on the display (704). For example, in FIG. 5J, gesture 576 is detected on display 112. Gesture 576 starts on a location corresponding to the first location of graphical object 566.

In response to detecting the first gesture, the device moves the graphical object across the display to a second location on the display, distinct from the first location (706). For example, in response to detection of gesture 576, graphical object 566 moves (e.g., continuously moves) across display 112 to a second location on display 112 distinct from the first location (e.g., bottom side of display 112), as shown in FIGS. 5J-5L.

In some embodiments, the first location is adjacent to a first side of the display, and the second location is adjacent to a second side of the display, opposite the first side of the display (708).

In some embodiments, the first side is a top of the display, and the second side is a bottom of the display (710). For example, in FIG. 5J, graphical object 566 is adjacent to the top side of display 112. In FIG. 5L, graphical object 566 is adjacent to the bottom side (opposite of the top side) of display 112.

In some other embodiments, the first side is a left side of the display, and the second side is a right side of the display (712). For example, in FIG. 5O, graphical object 586 is adjacent to the left side of display 112. In FIG. 5Q, after graphical object 586 moves to a second location on display 112, graphical object 586 is adjacent to the right side of display 112.

In some embodiments, the graphical object has a length, the first side of the display has a length, and the length of the graphical object equals (or is substantially equal to, e.g., 85%, 90%, or 95%) the length of the first side of the display (714). For example, in FIG. 5J, the length 572 of graphical object 566 may be equal to the length 570 of the top side of display 112 (not shown).

In some embodiments, the graphical object has an activation region with an activation region length, the first side of the display has a length, and the activation region length equals (or is substantially equal to, e.g., 85%, 90%, or 95%) the length of the first side of the display (716). For example, in FIG. 5J, the length 574 of activation region 568 may be equal to the length 570 of the top side of display 112.

Also in response to detecting the first gesture, the device displays a second user interface on the display, distinct from the first user interface, the second user interface including the graphical object at the second location on the display (718). For example, in FIG. 5L, in response to detection of gesture 576, second user interface 580 is displayed. In second user interface 580, graphical object 566 is displayed next to the bottom side of display 112, whereas in first user interface 564, graphical object 566 is displayed next to the top side of display 112 (FIG. 5J). As another example, in FIG. 5Q, in response to detection of gesture 594, second user interface 580 is displayed. In second user interface 580, graphical object 586 is displayed next to the right side of display 112, whereas in first user interface 564, graphical object 586 is displayed next to the left side of display 112 (FIG. 5O).

In some embodiments, displaying the second user interface in response to detecting the first gesture includes replacing display of the first user interface with display of the second user interface (720). For example, in FIGS. 5J-5L, in response to detection of gesture 576, first user interface 564 is replaced on the display with second user interface 580.

In some embodiments, displaying the second user interface in response to detecting the first gesture includes displaying an animation of the second user interface replacing the first user interface (722). For example, FIG. 5K shows an instance in the animated transition from first user interface 564 to second user interface 580.

While displaying the second user interface, the device detects a second gesture by the user on the touch-sensitive surface, the second gesture starting at a location on the touch-sensitive surface that corresponds to the second location of the graphical object on the display (724). For example, gesture 582 (FIG. 5L) is detected on display 112. Gesture 582 starts at a location corresponding to the second location of graphical object 566.

In some embodiments, the first gesture moves in a first direction on the touch-sensitive surface, and the second gesture moves in a second direction on the touch-sensitive surface, opposite the first direction (726). For example, gesture 576 (FIG. 5J) moves in direction 578, and gesture 582 (FIG. 5L) moves in direction 584; gestures 576 and 582 move in opposite directions.

In some embodiments, the touch-sensitive surface is on the display, the first gesture moves in a first direction on the touch-sensitive surface away from a side of the display closest to the first location of the graphical object on the display, and the second gesture moves in a second direction on the touch-sensitive surface away from a side of the display closest to the second location of the graphical object on the display (728). For example, gesture 576 (FIG. 5J) moves in direction 578 away from the top side of display 112, where graphical object 566 is displayed within first user interface 564. Gesture 582 (FIG. 5L) moves in direction 584 away from the bottom side of display 112, where graphical object 566 is displayed within second user interface 580.

In some embodiments, the first gesture is a swipe gesture and the second gesture is a swipe gesture (730). In some embodiments, the swipe gesture (also called a flick gesture) is vertical (e.g., up or down). In some embodiments, the swipe gesture is horizontal (e.g., left or right). For example, gesture 576 (FIG. 5J) and gesture 582 (FIG. 5L) may be swipe gestures in directions 587 and 584, respectively. As another example, gesture 594 (FIG. 5O) and gesture 598 (FIG. 5Q) may be swipe gestures in directions 596 and 5102, respectively.

In some embodiments, the first gesture is a drag gesture and the second gesture is a drag gesture (732). In some embodiments, the drag gesture is vertical (e.g., up or down). In some embodiments, the drag gesture is horizontal (e.g., left or right). For example, gesture 576 (FIG. 5J) and gesture 582 (FIG. 5L) may be drag gestures dragging graphical object 566 in directions 587 and 584, respectively. As another example, gesture 594 (FIG. 5O) and gesture 598 (FIG. 5Q) may be drag gestures dragging graphical object 586 in directions 596 and 5102, respectively.

In some embodiments, the first gesture is a tap gesture and the second gesture is a tap gesture (734). For example, gesture 576 (FIG. 5J) and gesture 582 (FIG. 5L) may be tap gestures on graphical object 566. As another example, gesture 594 (FIG. 5O) and gesture 598 (FIG. 5Q) may be tap gestures on graphical object 586.

In response to detecting the second gesture, the device moves the graphical object across the display to the first location on the display (736), and displays the first user interface on the display (738). For example, in FIGS. 5L-5N, in response to detection of gesture 582, graphical object 566 is moved across display 112, back to the top side of display 112 and first user interface 564 is displayed. As another example, in FIGS. 5Q-5S, in response to detection of gesture 598, graphical object 586 is moved back across display 112, to the left side of display 112 and first user interface 564 is displayed. The movement and continuous display of the graphical object in both the first and second user interfaces helps to remind a user how to go back and forth (toggle) between the two interfaces.

In some embodiments, displaying the first user interface in response to detecting the second gesture includes replacing display of the second user interface with display of the first user interface (740). For example, in FIGS. 5L-5N, in response to detection of gesture 582, second user interface 580 is replaced on the display with first user interface 564.

In some embodiments, displaying the first user interface in response to detecting the second gesture includes displaying an animation of the first user interface replacing the second user interface (742). For example, FIG. 5M shows an instance in the animated transition from second user interface 580 to first user interface 564.

In some embodiments, the first user interface is in a first application and the second user interface is in the first application (744). In other words, the first user interface and the second user interface are part of the same application.

Figure 8:
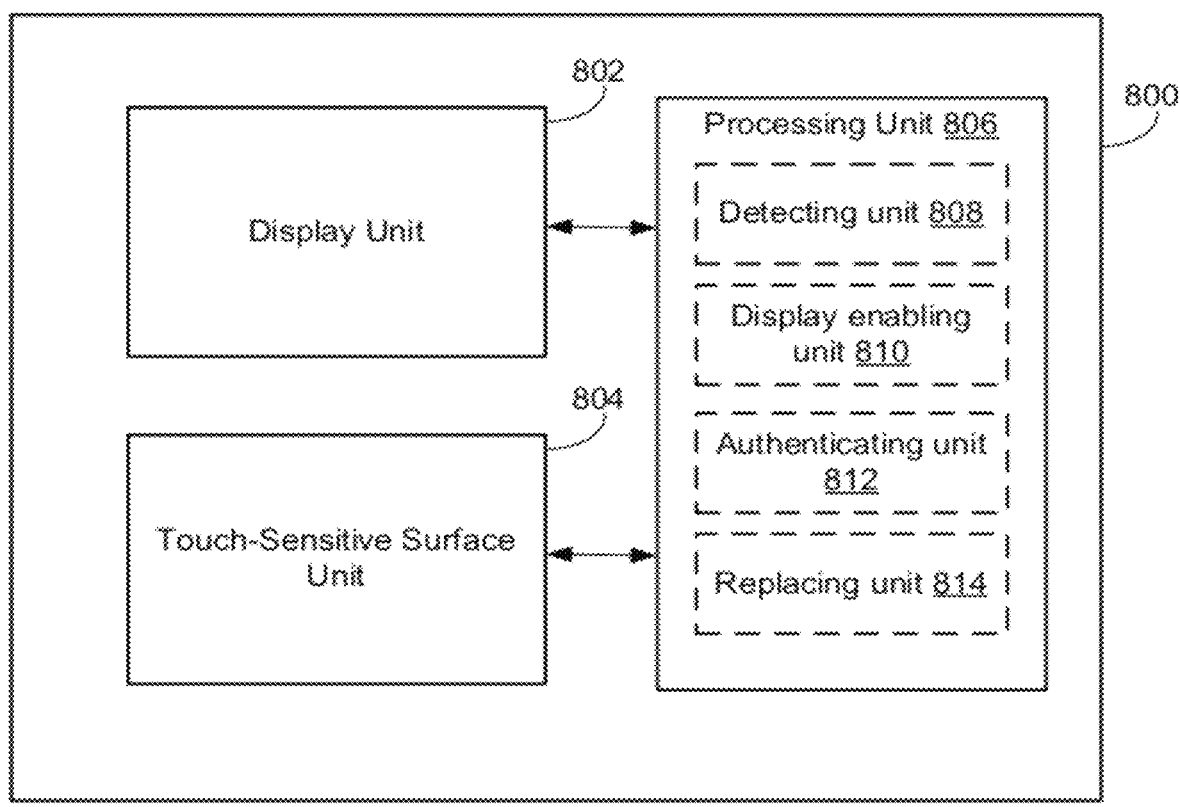
FIG. 8 is a functional block diagram of an electronic device in accordance with some embodiments.

In accordance with some embodiments, FIG. 8 shows a functional block diagram of an electronic device 800 configured in accordance with the principles of the invention as described above. The functional blocks of the device may be implemented by hardware, software, or a combination of hardware and software to carry out the principles of the invention. It is understood by persons of skill in the art that the functional blocks described in FIG. 8 may be combined or separated into sub-blocks to implement the principles of the invention as described above. Therefore, the description herein may support any possible combination or separation or further definition of the functional blocks described herein.

As shown in FIG. 8, an electronic device 800 includes a display unit 802 configured to display a first authentication user interface, the first authentication user interface including a text entry field for entering a text-based authentication code; a touch-sensitive surface unit 804 configured to receive user inputs; and a processing unit 806 coupled to the display unit 802 and the touch-sensitive surface unit 804. In some embodiments, the processing unit 806 includes a detecting unit 808, a display enabling unit 810, an authenticating unit 812, and a replacing unit 814.

The processing unit 806 is configured to: detect a first input by a user on the touch-sensitive surface unit 804 while the display unit 802 displays the first authentication user interface (e.g., with the detecting unit 808); in response to detecting the first input, enable display of a second authentication user interface on the display unit 802, distinct from the first authentication user interface (e.g., with the display enabling unit 810), the second authentication user interface configured for entering a gesture-based authentication code; while the display unit 802 displays the second authentication user interface, detect one or more gestures by the user at locations on the touch-sensitive surface unit 804 that correspond to locations on the second authentication user interface (e.g., with the detecting unit 808); and authenticate the user in accordance with a determination that the detected one or more gestures correspond to a gesture-based authentication code for the user (e.g., with the authenticating unit 812).

In some embodiments, enabling display of the second authentication user interface in response to detecting the first input comprises replacing display of the first authentication user interface with display of the second authentication user interface (e.g., with the replacing unit 814).

In some embodiments, enabling display of the second authentication user interface in response to detecting the first input comprises enabling display of an animation of the second authentication user interface replacing the first authentication user interface.

In some embodiments, the first input is a swipe gesture.

In some embodiments, the first input is a drag gesture.

In some embodiments, the first input is a tap gesture.

In some embodiments, the first input is initiated at a location on the touch-sensitive surface unit 804 that corresponds to a location of a graphical object on the display unit 802, the graphical object being displayed in both the first authentication user interface and the second authentication user interface.

In some embodiments, the graphical object moves from a first location on the display unit 802 in the first authentication user interface to a second location on the display unit 802 in the second authentication user interface, distinct from the first location on the display unit 802.

In some embodiments, the processing unit 806 is configured to: while the display unit 802 displays the second authentication user interface, detect a second input that is initiated at a location on the touch-sensitive surface unit 804 that corresponds to a location of the graphical object on the display unit 802 (e.g., with the detecting unit 808); and, in response to detecting the second input, replace display of the second authentication user interface with display of the first authentication user interface (e.g., with the replacing unit 814).

In some embodiments, the first input is a swipe gesture in a first direction and the second input is a swipe gesture in a direction opposite to the first direction.

In some embodiments, the first input is a drag gesture in a first direction and the second input is a drag gesture in a direction opposite to the first direction.

In some embodiments, use of gesture-based authentication at the electronic device 800 requires a prior authentication of the user at the electronic device 800 via text-based authentication.

In some embodiments, use of gesture-based authentication requires a prior authentication of the user at the electronic device 800 via text-based authentication without any intervening authentication at the electronic device 800 by another user.

In some embodiments, use of gesture-based authentication requires a prior authentication of the user at the electronic device 800 via text-based authentication within a predefined time period.

In some embodiments, authenticating the user provides access to one of: a remote computer system, a digital content store, or a digital application store.

Figure 9:
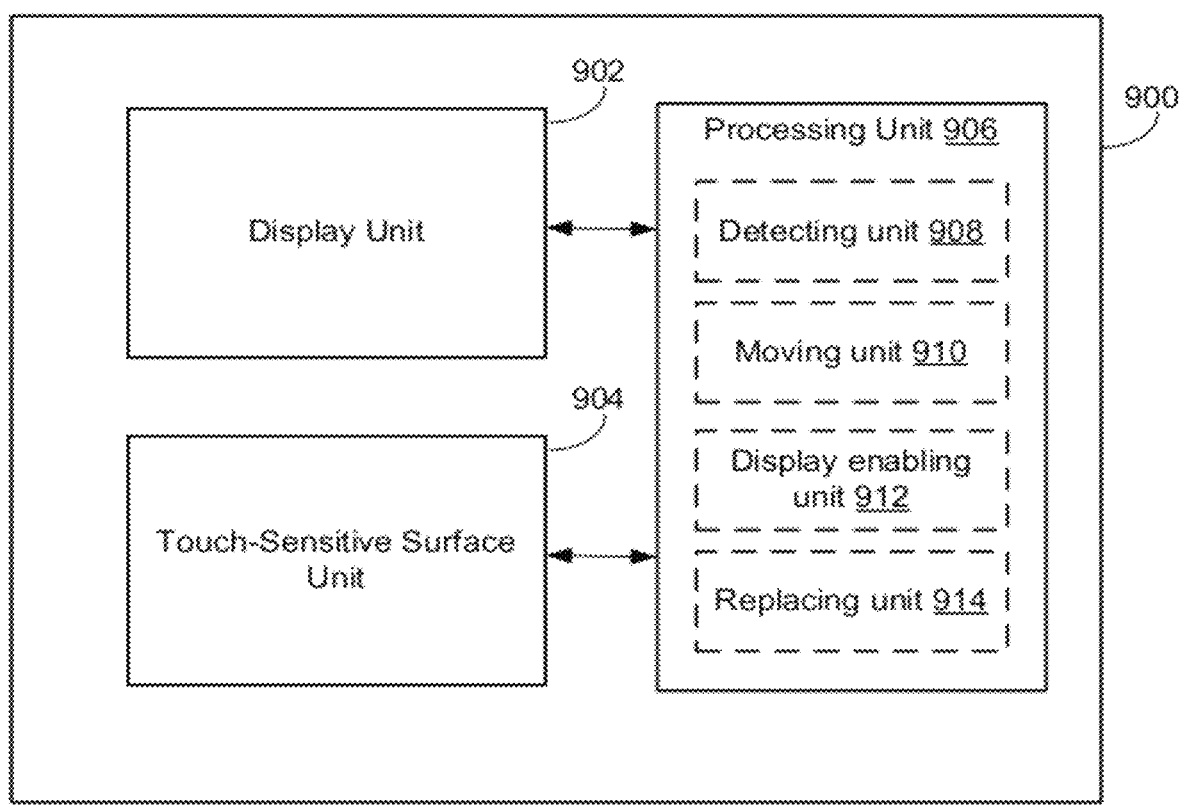
FIG. 9 is a functional block diagram of an electronic device in accordance with some embodiments.

In accordance with some embodiments, FIG. 9 shows a functional block diagram of an electronic device 900 configured in accordance with the principles of the invention as described above. The functional blocks of the device may be implemented by hardware, software, or a combination of hardware and software to carry out the principles of the invention. It is understood by persons of skill in the art that the functional blocks described in FIG. 9 may be combined or separated into sub-blocks to implement the principles of the invention as described above. Therefore, the description herein may support any possible combination or separation or further definition of the functional blocks described herein.

As shown in FIG. 9, an electronic device 900 includes a display unit 902 configured to display a first user interface, the first user interface including a graphical object at a first location on the display unit 902; a touch-sensitive surface unit 904 configured to receive gestures; and a processing unit 906 coupled to the display unit 902 and the touch-sensitive surface unit 904. In some embodiments, the processing unit 906 includes a detecting unit 908, a moving unit 910, a display enabling unit 912, and a replacing unit 914.

The processing unit 906 is configured to: while the display unit 902 displays the first user interface, detect a first gesture by a user on the touch-sensitive surface unit 904 (e.g., with the detecting unit 908), the first gesture starting at a location on the touch-sensitive surface unit 904 that corresponds to the first location of the graphical object on the display unit 902; in response to detecting the first gesture: move the graphical object across the display unit 902 to a second location on the display unit 902, distinct from the first location (e.g., with the moving unit 910); and enable display of a second user interface on the display unit 902, distinct from the first user interface (e.g., with the display enabling unit 912), the second user interface including the graphical object at the second location on the display unit 902; while the display unit 902 displays the second user interface, detect a second gesture by the user on the touch-sensitive surface unit 904 (e.g., with the detecting unit 908), the second gesture starting at a location on the touch-sensitive surface unit 904 that corresponds to the second location of the graphical object on the display unit 902; and, in response to detecting the second gesture: move the graphical object across the display unit 902 to the first location on the display unit 902 (e.g., with the moving unit 910); and enable display of the first user interface on the display unit 902 (e.g., with the display enabling unit 912).

In some embodiments, the first location is adjacent to a first side of the display unit 902, and the second location is adjacent to a second side of the display unit 902, opposite the first side of the display unit 902.

In some embodiments, the first side is a top of the display unit 902, and the second side is a bottom of the display unit 902.

In some embodiments, the first side is a left side of the display unit 902, and the second side is a right side of the display unit 902.

In some embodiments, the graphical object has a length; the first side of the display unit 902 has a length; and the length of the graphical object equals the length of the first side of the display unit 902.

In some embodiments, the graphical object has an activation region with an activation region length; the first side of the display unit 902 has a length; and the activation region length equals the length of the first side of the display unit 902.

In some embodiments, the first gesture moves in a first direction on the touch-sensitive surface unit 904, and the second gesture moves in a second direction on the touch-sensitive surface unit 904, opposite the first direction.

In some embodiments, the touch-sensitive surface unit 904 is on the display unit 902; the first gesture moves in a first direction on the touch-sensitive surface unit 904 away from a side of the display unit 902 closest to the first location of the graphical object on the display unit 902; and the second gesture moves in a second direction on the touch-sensitive surface unit 904 away from a side of the display unit 902 closest to the second location of the graphical object on the display unit 902.

In some embodiments, enabling display of the second user interface in response to detecting the first gesture comprises replacing display of the first user interface with display of the second user interface (e.g., with the replacing unit 914); and enabling display of the first user interface in response to detecting the second gesture comprises replacing display of the second user interface with display of the first user interface (e.g., with the replacing unit 914).

In some embodiments, enabling display of the second user interface in response to detecting the first gesture comprises enabling display of an animation of the second user interface replacing the first user interface (e.g., with the display enabling unit 912); and enabling display of the first user interface in response to detecting the second gesture comprises enabling display of an animation of the first user interface replacing the second user interface (e.g., with the display enabling unit 912).

In some embodiments, the first gesture is a swipe gesture and the second gesture is a swipe gesture.

In some embodiments, the first gesture is a drag gesture and the second gesture is a drag gesture.

In some embodiments, the first gesture is a tap gesture and the second gesture is a tap gesture.

In some embodiments, the first user interface is in a first application and the second user interface is in the first application.

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A and 3) are all included within the scope of protection of the invention.

The operations described above with reference to FIGS. 6A-6C, 7A-7B may be implemented by components depicted in FIGS. 1A-1B. For example, detection operations 604 and 630, displaying operation 612, and authenticating operation 632 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An electronic device, comprising:
   a display;
   a touch-sensitive surface;
   one or more processors;
   memory; and
   one or more programs, wherein the one or more programs are stored in the memory and configured to be executed by the one or more processors, the one or more programs including instructions for:
   displaying a first authentication user interface on the display, the first authentication user interface including a text entry field for entering a text-based authentication code;
   detecting a first input by a user on the touch-sensitive surface while displaying the first authentication user interface;
   in response to detecting the first input, displaying a second authentication user interface on the display, distinct from the first authentication user interface, the second authentication user interface including a plurality of authentication gesture objects and configured for entering a gesture-based authentication code;
   while displaying the second authentication user interface, detecting one or more gestures by the user at locations on the touch-sensitive surface that correspond to locations of at least two of the plurality of authentication gesture objects on the second authentication user interface; and
   authenticating the user in accordance with a determination that the detected one or more gestures correspond to a gesture-based authentication code for the user.

2. The device of claim 1, wherein displaying the second authentication user interface in response to detecting the first input comprises:
   replacing display of the first authentication user interface with display of the second authentication user interface.

3. The device of claim 1, wherein displaying the second authentication user interface in response to detecting the first input comprises:
   displaying an animation of the second authentication user interface replacing the first authentication user interface.

4. The device of claim 1, wherein the first input is a swipe gesture.

5. The device of claim 1, wherein the first input is a drag gesture.

6. The device of claim 1, wherein the first input is a tap gesture.

7. The device of claim 1, wherein the first input is initiated at a location on the touch-sensitive surface that corresponds to a location of a graphical object on the display, the graphical object being displayed in both the first authentication user interface and the second authentication user interface.

8. The device of claim 7, wherein the graphical object moves from a first location on the display in the first authentication user interface to a second location on the display in the second authentication user interface, distinct from the first location on the display.

9. The device of claim 8, including instructions for:
   while displaying the second authentication user interface, detecting a second input that is initiated at a location on the touch-sensitive surface that corresponds to a location of the graphical object on the display; and,
   in response to detecting the second input, replacing display of the second authentication user interface with display of the first authentication user interface.

10. The device of claim 9, wherein the first input is a swipe gesture in a first direction and the second input is a swipe gesture in a direction opposite to the first direction.

11. The device of claim 9, wherein the first input is a drag gesture in a first direction and the second input is a drag gesture in a direction opposite to the first direction.

12. The device of claim 1, wherein use of gesture-based authentication at the electronic device requires a prior authentication of the user at the electronic device via text-based authentication.

13. The device of claim 1, wherein use of gesture-based authentication requires a prior authentication of the user at the electronic device via text-based authentication without any intervening authentication at the electronic device by another user.

14. The device of claim 1, wherein use of gesture-based authentication requires a prior authentication of the user at the electronic device via text-based authentication within a predefined time period.

15. The device of claim 1, wherein authenticating the user provides access to one of: a remote computer system, a digital content store, or a digital application store.

16. A method, comprising:
   at an electronic device with a display and a touch-sensitive surface:
   displaying a first authentication user interface on the display, the first authentication user interface including a text entry field for entering a text-based authentication code;
   detecting a first input by a user on the touch-sensitive surface while displaying the first authentication user interface;
   in response to detecting the first input, displaying a second authentication user interface on the display, distinct from the first authentication user interface, the second authentication user interface including a plurality of authentication gesture objects and configured for entering a gesture-based authentication code;
   while displaying the second authentication user interface, detecting one or more gestures by the user at locations on the touch-sensitive surface that correspond to locations of at least two of the plurality of authentication gesture objects on the second authentication user interface; and authenticating the user in accordance with a determination that the detected one or more gestures correspond to a gesture-based authentication code for the user.

17. A non-transitory computer readable storage medium storing one or more programs, the one or more programs comprising instructions, which when executed by an electronic device with a display and a touch-sensitive surface, cause the device to:
   display a first authentication user interface on the display, the first authentication user interface including a text entry field for entering a text-based authentication code;
   detect a first input by a user on the touch-sensitive surface while displaying the first authentication user interface;
   in response to detecting the first input, display a second authentication user interface on the display, distinct from the first authentication user interface, the second authentication user interface including a plurality of authentication gesture objects and configured for entering a gesture-based authentication code;
   while displaying the second authentication user interface, detect one or more gestures by the user at locations on the touch-sensitive surface that correspond to locations of at least two of the plurality of authentication gesture objects on the second authentication user interface; and
   authenticate the user in accordance with a determination that the detected one or more gestures correspond to a gesture-based authentication code for the user.

18. A graphical user interface on an electronic device with a display, a touch-sensitive surface, a memory, and one or more processors to execute one or more programs stored in the memory, the graphical user interface comprising:
   a first authentication user interface on the display, the first authentication user interface including a text entry field for entering a text-based authentication code;
   wherein:
      a first input by a user on the touch-sensitive surface is detected while displaying the first authentication user interface;
      in response to detecting the first input, a second authentication user interface is displayed on the display, distinct from the first authentication user interface, the second authentication user interface including a plurality of authentication gesture objects and configured for entering a gesture-based authentication code;
      while displaying the second authentication user interface, one or more gestures by the user are detected at locations on the touch-sensitive surface that correspond to locations of at least two of the plurality of authentication gesture objects on the second authentication user interface; and
      the user is authenticated in accordance with a determination that the detected one or more gestures correspond to a gesture-based authentication code for the user.

19. The device of claim 1, wherein the first authentication user interface provides access to functions of a system and the second authentication user interface provides the same access to the functions of the system.

20. The method of claim 16, wherein the first authentication user interface provides access to functions of the electronic device and the second authentication user interface provides the same access to the functions of the electronic device.

21. The non-transitory computer readable storage medium of claim 17, wherein the first authentication user interface provides access to functions of the electronic device and the second authentication user interface provides the same access to the functions of the electronic device.

22. The device of claim 1, wherein
   the first authentication user interface comprises a keyboard for receiving touch inputs for inputting the text-based authentication code into the text entry field; and
   in response to detecting the first input, the keyboard is removed from the display.

23. The method of claim 16, wherein
   the first authentication user interface comprises a keyboard for receiving touch inputs for inputting the text-based authentication code into the text entry field; and
   in response to detecting the first input, the keyboard is removed from the display.

24. The non-transitory computer readable storage medium of claim 17, wherein
   the first authentication user interface comprises a keyboard for receiving touch inputs for inputting the text-based authentication code into the text entry field; and
   in response to detecting the first input, the keyboard is removed from the display.

25. The device of claim 22, wherein
   the first input is a gesture in a first direction; and
   in response to detecting the first input, the keyboard and the text entry field are removed from the display in the first direction.

26. The device of claim 1, wherein the one or more gestures comprise a swipe that contacts the locations on the touch-sensitive surface that correspond to the locations of the at least two of the plurality of authentication gesture objects on the second authentication user interface.

27. The method of claim 16, wherein the one or more gestures comprise a swipe that contacts the locations on the touch-sensitive surface that correspond to the locations of the at least two of the plurality of authentication gesture objects on the second authentication user interface.

28. The non-transitory computer readable storage medium of claim 17, wherein the one or more gestures comprise a swipe that contacts the locations on the touch-sensitive surface that correspond to the locations of the at least two of the plurality of authentication gesture objects on the second authentication user interface.

* * * * *